(12) United States Patent
Shirakata et al.

(10) Patent No.: US 8,989,100 B2
(45) Date of Patent: Mar. 24, 2015

(54) WIRELESS COMMUNICATION DEVICE AND SEMICONDUCTOR DEVICE

(75) Inventors: Naganori Shirakata, Kanagawa (JP); Naoya Yosoku, Kanagawa (JP)

(73) Assignee: Panasonic Corporation, Osaka (JP)

( * ) Notice: Subject to any disclaimer, the term of this patent is extended or adjusted under 35 U.S.C. 154(b) by 143 days.

(21) Appl. No.: 13/814,864

(22) PCT Filed: Feb. 6, 2012

(86) PCT No.: PCT/JP2012/000792
§ 371 (c)(1),
(2), (4) Date: Feb. 7, 2013

(87) PCT Pub. No.: WO2012/132190
PCT Pub. Date: Oct. 4, 2012

(65) Prior Publication Data
US 2013/0142099 A1    Jun. 6, 2013

(30) Foreign Application Priority Data
Mar. 30, 2011  (JP) ................................. 2011-075833

(51) Int. Cl.
*H04W 4/00*    (2009.01)
*H04W 52/18*   (2009.01)
*H04W 52/02*   (2009.01)

(52) U.S. Cl.
CPC ............ *H04W 52/18* (2013.01); *H04W 52/028* (2013.01); *Y02B 60/50* (2013.01)
USPC ........................... 370/328; 455/522; 714/749

(58) Field of Classification Search
None
See application file for complete search history.

(56) References Cited

U.S. PATENT DOCUMENTS

| 7,356,316 | B2 | 4/2008 | Ogiso et al. | |
|---|---|---|---|---|
| 2006/0072614 | A1 | 4/2006 | Ogiso et al. | |
| 2008/0253311 | A1* | 10/2008 | Jin | 370/311 |
| 2011/0019555 | A1* | 1/2011 | Gotoh et al. | 370/252 |
| 2011/0096679 | A1* | 4/2011 | Hayashino et al. | 370/252 |
| 2011/0211620 | A1* | 9/2011 | Khanna et al. | 375/219 |
| 2013/0002191 | A1* | 1/2013 | Jung et al. | 320/103 |

FOREIGN PATENT DOCUMENTS

| JP | 11-69397 A | 3/1999 |
|---|---|---|
| JP | 2001-326600 A | 11/2001 |
| JP | 3826893 B2 | 9/2006 |
| JP | 2008-205556 A | 9/2008 |
| JP | 2009-33464 A | 2/2009 |
| JP | 4551474 B2 | 9/2010 |
| WO | 2008/001461 A1 | 1/2008 |

OTHER PUBLICATIONS

International Search Report, mailed May 1, 2012, for International Application No. PCT/JP2012/000792, 4 pages.

* cited by examiner

*Primary Examiner* — Bob Phunkulh
(74) *Attorney, Agent, or Firm* — Seed IP Law Group PLLC

(57) ABSTRACT

A transmission power controller turns on a power supply to a transmitter at a given time taking a power rise time into account before a start time of transmission processing in the transmitter, and turns off the power supply to the transmitter when the transmission processing is finished. A reception power controller turns on a power supply to a receiver at a given time taking a power rise time into account before a time at which an ACK is assumed to be arrival from a wireless communication device on a receiver side responsive to data transmitted from the transmitter, and turns off the power supply to the receiver when the reception processing of the ACK in the receiver is finished.

5 Claims, 24 Drawing Sheets

WIRELESS COMMUNICATION DEVICE AND SEMICONDUCTOR DEVICE

TECHNICAL FIELD

The present invention relates to a wireless communication device, and a semiconductor device including a wireless communication circuit.

BACKGROUND ART

There has been studied a service that provides data including a variety of large-capacity contents using a high-definition image (including a moving image or a still image) or a sound to an end user through a wireless communication. In order to transmit large-volume data of several G (giga) bits at a high speed, there has been studied a wireless communication system that performs high-speed transmission of several Gbps with the use of a millimeter waveband including a 60 GHz band.

In the millimeter wave wireless communication system, a standardization work is conducted in an IEEE by, for example, IEEE 802.15.3c as a wireless PAN (personal area network), and by, for example, IEEE 802.11ad as a wireless LAN (local area network).

For example, in a single carrier transmission system using the millimeter waveband which has been studied in the IEEE802.11ad, a signal that has been subjected to PSK or QAM modulation is transmitted at 1.76 G symbols/sec. Data transmission at a super high speed where a time of one packet is short, that is, several μsec to several tens μsec, and a short inter-frame spacing is also short, that is, 3 μsec, is conducted. For that reason, an allowable latency for modulation and demodulation processing is short, and high speed arithmetic processing is required.

In a semiconductor circuit of an LSI that performs the high speed arithmetic processing, a size of transistors formed interiorly is increasingly miniaturized with an improvement of an operating frequency. However, there arises such a problem that the miniaturization causes an increase in leakage current.

A main cause of the leakage current is a quantum tunneling effect, which is generated by allowing electrons to pass through an insulator disposed between electric conductors located at a short distance. When a process rule of a digital semiconductor circuit requiring the high speed arithmetic operation becomes 100 nm or lower, more than half of a power consumed by the semiconductor circuit is consumed as the leakage current.

In the signal processing semiconductor circuit used in the millimeter wave wireless communication device that performs high speed transmission, for the purpose of reducing a power consumption, a power gating control that turns off a power supply of an unused circuit is an issue.

As a technique for reducing the power consumption in the wireless communication device, Patent Literatures 1 and 2 have been known. Patent Literature 1 discloses a technique in which when it is determined that an own device is not a destination at the time of receiving a header of an upper layer frame, a mode is shifted to a power saving mode on the basis of a length of the upper layer frame extracted from a header of a physical layer frame. Also, Patent Literature 2 discloses a technique in which a power supply is separate for each of arithmetic blocks in a semiconductor integrated circuit, and when input data effective in a buffer section of each arithmetic block could be prepared, a switch section that supplies a power to the arithmetic block is controlled, to thereby reduce a leakage current and realize a reduction in the power consumption.

CITATION LIST

Patent Literature

Patent Literature 1: Japanese Patent No. 3826893
Patent Literature 2: Japanese Patent No. 4551474

SUMMARY OF INVENTION

Technical Problem

The above-mentioned related art mainly turns off the power supply to the circuit under the control. A rise time is required since the power supply turns on until a supply voltage is stabilized because of a load capacity connected to the power supply, and several μsec is required. In a conventional radio communication, because a packet length is decades of several hundreds μsec to several msec, and a short inter-frame spacing is also a decade of a dozen μsec, several μsec of the rise time of the power supply can be ignored.

However, in the millimeter wave wireless communication, the packet length is a dozen μsec, and the short inter-frame spacing is about 3 μsec, which are short. This makes it difficult to ignore several μsec of the rise time of the power supply, with difficulty to perform the on/off control of the power supply for each of packets.

The present invention has been made in view of the above circumstances, and an object of the present invention is to enable a reduction in the power consumption of a circuit that performs signal processing even in a millimeter wave wireless communication that performs a high speed transmission.

Solution to Problem

A wireless communication device according to the present invention includes: a transmitter that performs transmission processing in a wireless communication; a transmission power supply section that supplies a power to the transmitter; a transmission power controller that controls a power supply to the transmitter; a receiver that performs reception processing in a wireless communication; a reception power supply section that supplies a power to the receiver; and a reception power controller that controls a power supply to the receiver, wherein the transmission power controller turns on the power supply to the transmitter at a given time taking a power rise time into account before a start time of the transmission processing in the transmitter, and turns off the power supply to the transmitter when the transmission processing is finished, and the reception power controller turns on the power supply to the receiver at a given time taking a power rise time into account before a time at which an ACK is assumed to be arrival from a wireless communication device on a receiver side responsive to data transmitted from the transmitter, and turns off the power supply to the receiver when the reception processing of the ACK in the receiver is finished.

A wireless communication device according to the present invention includes: a receiver that performs reception processing in a wireless communication; a reception power supply section that supplies a power to the receiver; a reception power controller that controls a power supply to the receiver; a transmitter that performs transmission processing in a wireless communication; a transmission power supply section that supplies a power to the transmitter; and a transmission power controller that controls a power supply to the transmitter, wherein the reception power controller turns on the power supply to the receiver at a given timing, and turns off the power supply to the receiver when the reception processing of the data in the receiver is finished, and when the receiver has received data addressed to an own station without errors based on data received by the receiver, the transmission power controller turns on the power supply to the transmitter at a given time taking a power rise time into account before a start time of the transmission processing of an ACK to a wireless communication device on a transmitter side responsive to the received data, and turns off the power supply to the transmitter when the transmission processing of the ACK is finished.

A semiconductor device according to the present invention includes a signal processor including: a transmitter that performs transmission processing in a wireless communication; a transmission power supply section that supplies a power to the transmitter; a transmission power controller that controls a power supply to the transmitter; a receiver that performs reception processing in a wireless communication; a reception power supply section that supplies a power to the receiver; and a reception power controller that controls a power supply to the receiver, wherein the transmission power controller turns on the power supply to the transmitter at a given time taking a power rise time into account before a start time of the transmission processing in the transmitter, and turns off the power supply to the transmitter when the transmission processing is finished, the reception power controller turns on the power supply to the receiver at a given time taking a power rise time into account before a time at which an ACK is assumed to be arrival from a wireless communication device on a receiver side responsive to data transmitted from the transmitter, and turns off the power supply to the receiver when the reception processing of the ACK in the receiver is finished, and a circuit including the signal processor is mounted on a semiconductor substrate.

A semiconductor device according to the present invention includes a signal processor including: a receiver that performs reception processing in a wireless communication; a reception power supply section that supplies a power to the receiver; a reception power controller that controls a power supply to the receiver; a transmitter that performs transmission processing in a wireless communication; a transmission power supply section that supplies a power to the transmitter; and a transmission power controller that controls a power supply to the transmitter; wherein the reception power controller turns on the power supply to the receiver at a given timing, and turns off the power supply to the receiver when the reception processing of the data in the receiver is finished, when the receiver has received data addressed to an own station without errors based on data received by the receiver, the transmission power controller turns on the power supply to the transmitter at a given time taking a power rise time into account before a start time of the transmission processing of an ACK to a wireless communication device on a transmitter side responsive to the received data, and turns off the power supply to the transmitter when the transmission processing of the ACK is finished, and a circuit including the signal processor is mounted on a semiconductor substrate.

With the above configuration, the on/off of the power supply to the transmitter and the receiver can be controlled at timing of the transmission data and the ACK to the transmission data. Accordingly, even in the millimeter wave wireless communication that performs the high speed transmission, the power consumption of the circuit that performs the signal processing can be reduced.

Advantageous Effects of Invention

According to the present invention, even in the millimeter wave wireless communication that performs the high speed transmission, the power consumption of the circuit that performs the signal processing can be reduced.

DESCRIPTION OF EMBODIMENTS

In the following embodiment, a configuration example of a wireless communication device and a semiconductor device which can be applied to a millimeter wave wireless communication system that performs a high speed transmission with the use of a millimeter waveband will be described as an example of a wireless communication device and a semiconductor device.

Figure 1:
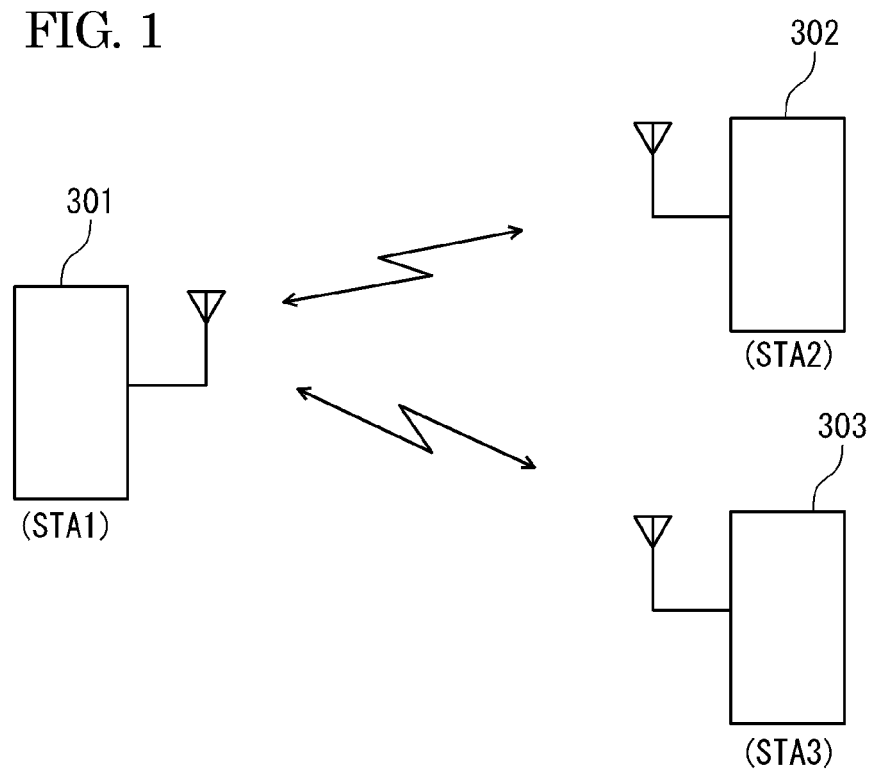
FIG. 1 is a diagram illustrating a configuration example of a wireless communication system according to an embodiment of the present invention.

FIG. 1 is a diagram illustrating a configuration example of a wireless communication system according to an embodiment of the present invention. The wireless communication system includes a wireless communication terminal (STA1) 301 of a data transmission source, and a wireless communication terminal (STA2) 302 and a wireless communication terminal (STA3) 303, which are data destinations. In this configuration, data is transmitted from the wireless communication terminal 301 to the wireless communication terminal 302 or 303, or the wireless communication terminals 302 and 303.

In each of the wireless communication terminals 302 and 303, if data for the own station could be received without error, an ACK (acknowledgement) is returned to the wireless communication terminal 301 which is the transmission source. Individual addresses are allocated to the respective wireless communication terminals, and the transmission source and the destinations are discriminated on the basis of the allocated addresses.

Figure 2:
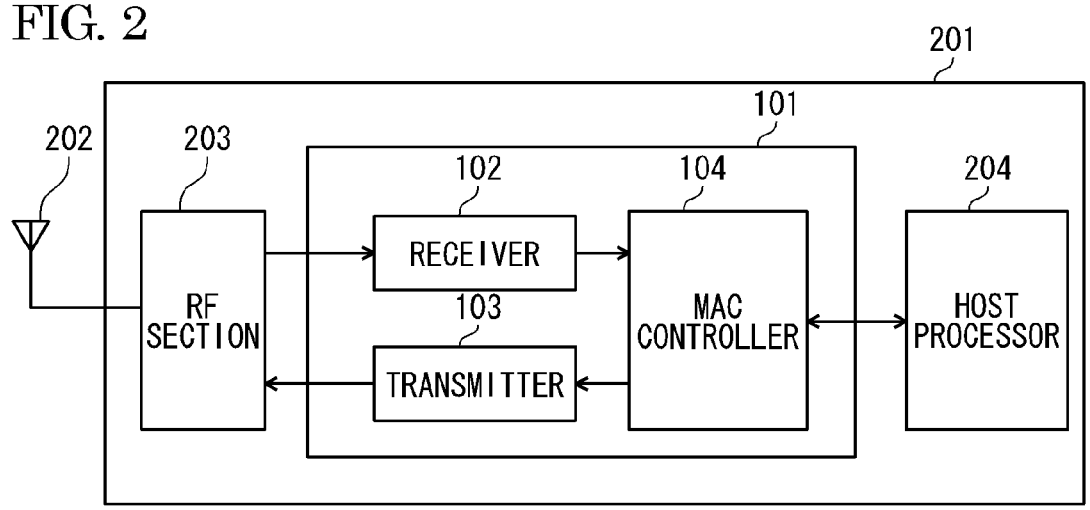
FIG. 2 is a block diagram illustrating a configuration example of a wireless communication device according to the embodiment of the present invention.

FIG. 2 is a block diagram illustrating a configuration example of a wireless communication device configuring each of the wireless communication terminals 301 and 302. The wireless communication device includes an antenna 202 and a wireless processor 201. The wireless processor 201 includes an RF section 203, a baseband processor 101, and a host processor 204. The baseband processor 101 includes a receiver 102, a transmitter 103, and a MAC (media access control) controller 104.

The RF section 203 up-converts an analog baseband signal output from the transmitter 103 into a radio frequency signal, and down-converts a radio frequency signal received by the antenna 202 into an analog baseband signal and inputs the converted signals to the receiver 102.

The transmitter 103 performs a variety of processing including modulation processing on a received signal. The transmitter 103 and the receiver 102 process a PHY layer (physical layer) in a network. The MAC controller 104 processes a MAC layer (a part of a data link layer) in the network, and performs an access control in a wireless communication.

In the wireless communication terminal on the transmitter side, when the host processor 204 requests a data communication with another wireless communication terminal, the MAC controller 104 performs the access control in the wireless communication. When transmitting the data, the MAC controller 104 converts data to be transmitted and an access control header into a MAC frame, and inputs the frame to the transmitter 103.

The transmitter 103 converts the input MAC frame into a PLCP (physical layer convergence protocol) frame in which a PHY (physical layer) header including a modulation system and a packet length is added to the input MAC frame. The transmitter 103 further adds, for example, a preamble to the PLCP, and converts the PLCP into a PHY frame as a signal necessary for demodulation. Then, the transmitter 103 modulates the PHY frame into an analog baseband signal, and inputs the analog baseband signal to the RF section 203.

The RF section 203 up-converts the input analog baseband signal into a radio frequency signal, and transmits the radio frequency signal from the antenna 202.

In the wireless communication terminal on the receiver side, the RF section 203 down-converts the radio communication signal received by the antenna 202 into an analog baseband signal, and inputs the analog baseband signal to the receiver 102.

The receiver 102 performs synchronization processing on the preamble of the receive signal of the analog baseband signal, and demodulates the received frame. When the PHY header can be demodulated in success, the receiver 102 demodulates a payload portion according to the information on the modulation system and the packet length, and outputs a demodulation result to the MAC controller 104.

The MAC controller 104 analyzes the MAC frame on the basis of the input demodulation result, performs the access control, and outputs the received data to the host processor 204.

Figure 3:
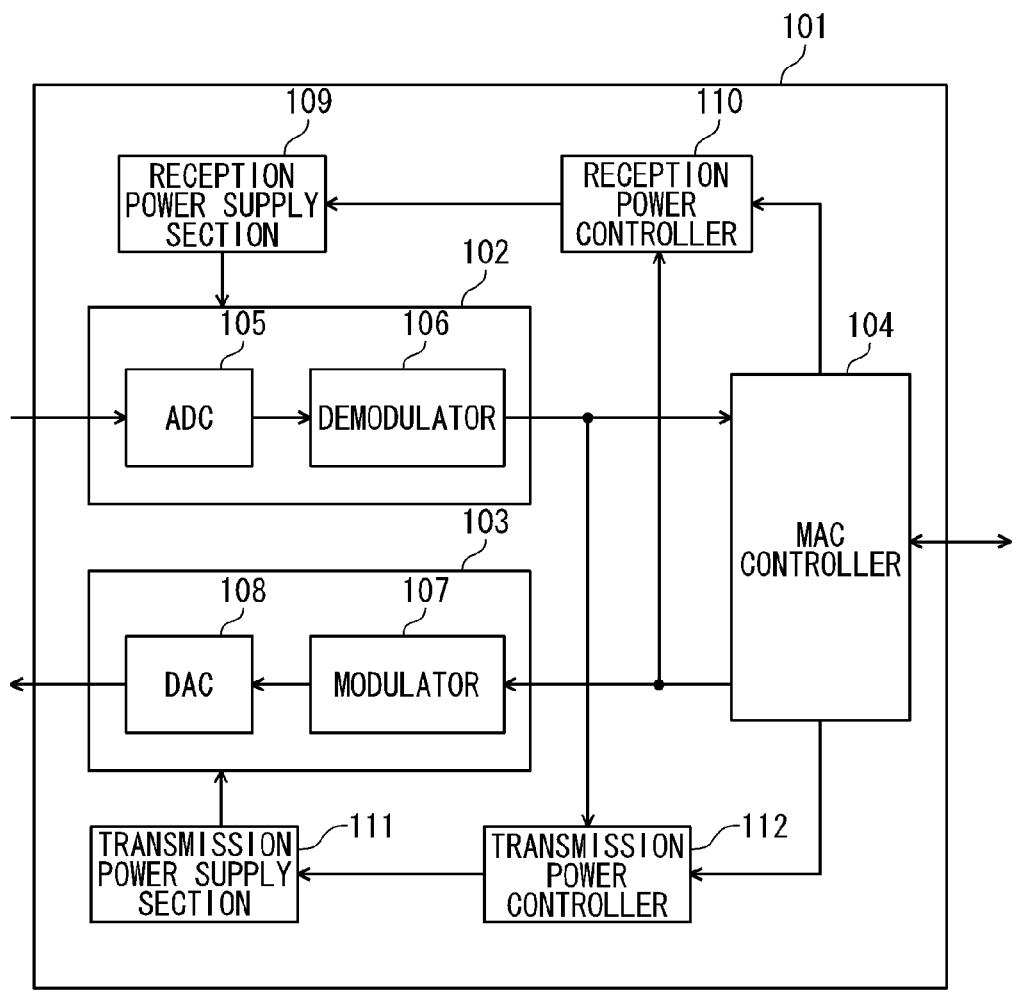
FIG. 3 is a block diagram illustrating a configuration of a baseband processor according to the embodiment of the present invention.

FIG. 3 is a block diagram illustrating a configuration of the baseband processor in the wireless communication terminal according to this embodiment. The baseband processor 101 is configured by a semiconductor integrated circuit of, for example, an LSI, and can be included within the wireless communication terminal as a semiconductor device including a wireless communication circuit.

The baseband processor 101 includes the receiver 102, the transmitter 103, and the MAC controller 104 as described above, and includes a reception power supply section 109, a reception power controller 110, a transmission power supply section 111, and a transmission power controller 112. The receiver 102 includes an AD converter (ADC) 105 and a demodulator 106. The transmitter 103 includes a modulator 107 and a DA converter (DAC) 108.

The power supplies of the receiver 102 and the transmitter 103 are independent from each other. The receiver 102 receives the power supply from the reception power supply section 109, and the transmitter 103 receives the power supply from the transmission power supply section 111.

When the MAC controller 104 receives a request for the wireless communication from the host processor 204, the MAC controller 104 determines whether the radio communication is transmission or reception according to an access control protocol. If the wireless communication is reception, the MAC controller 104 requests the reception power controller 110 to turn on the power supply to the receiver 102. On the other hand, if the wireless communication is transmission, the MAC controller 104 requests the transmission power controller 112 to turn on the power supply to the transmitter 103.

The reception power controller 110 controls the reception power supply section 109 to supply a power to the receiver 102 in response to a power-on request from the MAC controller 104, and puts the receiver 102 into a state where the wireless communication is enabled. Also, the transmission power controller 112 controls the transmission power supply section 111 to supply a power to the transmitter 103 in response to a power-on request from the MAC controller 104, and puts the transmitter 103 into a state where the wireless communication is enabled.

In this embodiment, the power supplies to the transmitter 103 and the MAC controller 104 are separated from each other, and in order to turn on/off the power supply in the transmitter 103 and the receiver 102, independently from each other, the power control is conducted in the transmission power supply section 111 and the reception power controller 110.

At the time when the header included in the packet which is now being received can be demodulated, if it is predicted that the packet is transmitted immediately after the demodulation, the transmission power supply section 111 turns on the power supply to the transmitter 103 in advance, taking a power rise time into account. If it is predicted that the packet is received immediately after the transmission, from the header included in the packet which is now being received, the reception power controller 110 turns on the power supply to the receiver 102 in advance, taking the power rise time into account. In the prediction of the subsequent packet processing, MAC control information can be used.

The MAC control information includes at least one of a destination ID, presence or absence of an ACK request or a block ACK request, and presence or absence of a header error in the header information of the packet that is being transmitted or received.

The MAC controller 104 starts the wireless communication according to the access control protocol. When transmitting, the MAC controller 104 generates the MAC frame to be transmitted, and inputs the MAC frame to the transmitter 103. The transmitter 103 modulates the input MAC frame into the PHY frame by the modulator 107, and converts the PHY frame into an analog baseband signal by the DA converter 108, and outputs the analog baseband signal. The modulator 107 has a function of a transmitter header processor that performs header processing on the data which is being transmitted to acquire the header information.

In this example, the MAC frame to be transmitted is also input to the reception power controller 110. The reception power controller 110 determines a timing at which the MAC frame is to be received subsequently, on the basis of the control information of the MAC frame which is now being transmitted. In order to stably supply the power to the receiver 102 at the timing to be received, the reception power controller 110 instructs the reception power supply section 109 to control the power-on at an offset timing advanced by the power rise time of about several μsec.

When the MAC controller 104 determines that the transmission of the present PHY frame has been finished, and the power supply to the transmitter 103 can be turned off, the MAC controller 104 requests the transmission power controller 112 to turn off the power supply to the transmitter 103. The transmission power controller 112 controls the transmission power supply section 111, and stops the power supply to the transmitter 103 in response to a power-off request from the MAC controller 104.

When receiving, the AD converter 105 converts the analog baseband signal input to the baseband processor 101 into a digital signal, and the demodulator 106 demodulates the PHY frame. The demodulator 106 has a function of a receiver header processor that performs header processing on the data which is being demodulated to acquire the header information. The demodulated payload, that is, MAC frame is input to the MAC controller 104. The MAC controller 104 performs the reception processing according to the access control protocol.

When there is an ACK request to the presently received MAC frame, there is a need to transmit the ACK frame. The MAC controller 104 determines whether the ACK frame is transmitted or not, according to the access control protocol, and when transmitting, the MAC controller 104 generates the ACK frame to conduct transmitting operation.

In this example, the received MAC frame is also input to the transmission power controller 112. The transmission power controller 112 determines a timing at which the MAC frame is to be transmitted subsequently, on the basis of the control information of the PHY header and the MAC frame which are now being received. In order to stably supply the power to the transmitter 103 at the timing to be transmitted, the transmission power controller 112 instructs the transmission power supply section 111 to control the power-on at an offset timing advanced by the power rise time of about several μsec.

When the MAC controller 104 determines that the reception of the present PHY frame has been finished, and the power supply to the receiver 102 can be turned off, the MAC controller 104 requests the reception power controller 110 to turn off the power supply to the receiver 102. The reception power controller 110 controls the reception power supply section 109, and stops the power supply to the receiver 102 in response to a power-off request from the MAC controller 104.

Figure 4:
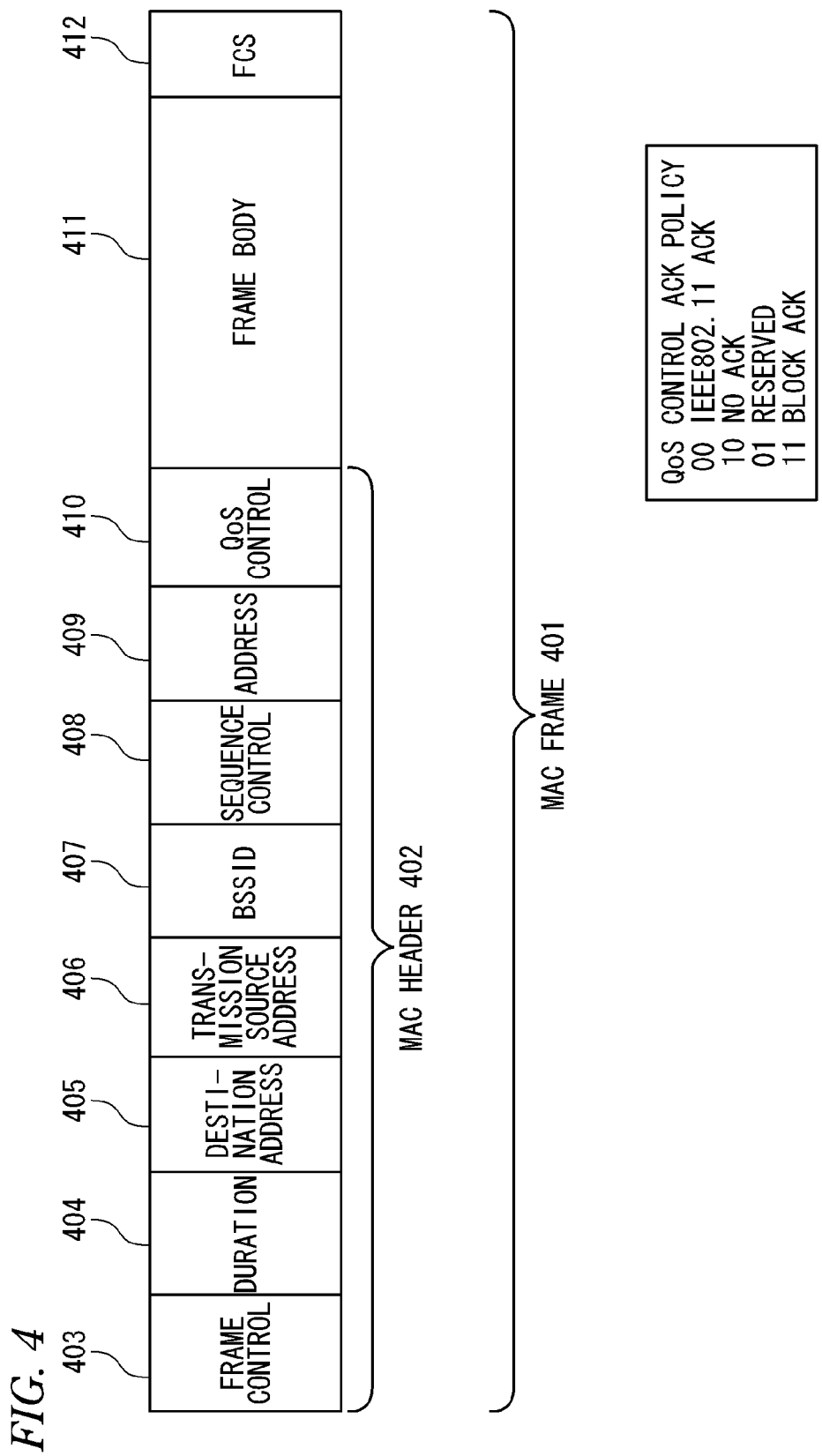
FIG. 4 is a diagram illustrating a configuration of a MAC frame.

FIG. 4 is a diagram illustrating a configuration of the MAC frame. A MAC frame 401 includes a MAC header 402, a frame body 411 that stores data therein, and an FCS (frame check sequence) field 412 for detecting an error. The FCS field 412 is arranged on a trailing side of the frame body 411, and used as an error detection field.

The MAC header 402 includes a variety of control fields, and has a frame control (frame control) field 403 indicative of a frame type, a duration (duration) field 404 indicative of an occupation time of the frame, a destination address field 405, and a transmission source address field 406.

Also, the MAC header 402 includes a BSSID (basic service set identifier) field 407, a sequence control field 408, an address field 409, and a QoS (quality of service) control field 410 indicative of the ACK request.

The QoS control field 410 stores, as information (QoS control ACK policy) indicative of the type of the ACK request, any one of "00": immediate ACK transmission compliant with IEEE 802.11, "10": no ACK transmission, and "11": block ACK transmission therein. "01" is reserved information for future extension.

If the address of the destination address field 405 is addressed to the own station, the radio communication terminal on the receiver side transmits the ACK to the address of the transmission source address field 406 according to the ACK request of the QoS control field 410.

The immediate ACK transmission is an ACK request for transmitting the ACK frame immediately after 3 μsec which is a short inter-frame spacing (SIFS: short inter frame spacing) after receiving the packet. The block ACK transmission is an ACK request for transmitting the ACKs for a plurality of packets that has been received in the past in block.

The block ACK transmission is further classified into the immediate block ACK for transmitting the plurality of ACKs in block immediately, and a delay ACK for not currently transmitting the ACKs but transmitting the ACKs the subsequent packets in block.

Figure 5:
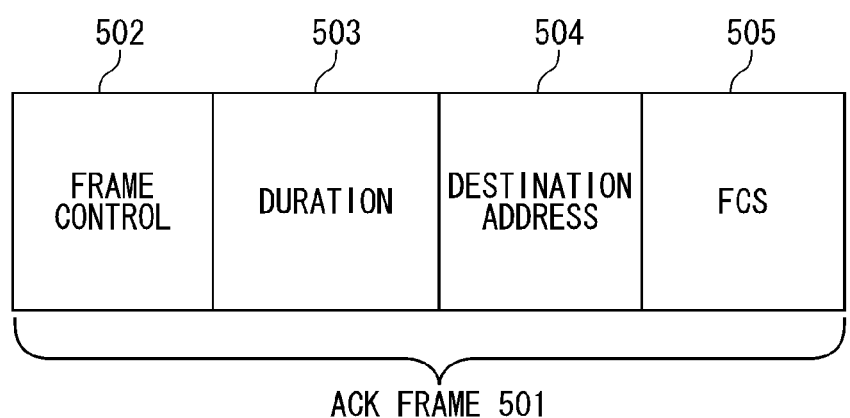
FIG. 5 is a diagram illustrating a configuration of an ACK frame.

FIG. 5 is a diagram illustrating a configuration of the ACK frame. An ACK frame 501 is a shortest packet having a frame control field 502 indicative of the ACK, and a destination address field 504 as main information. Also, the ACK frame 501 includes a duration field 503 and an FCS 505.

Figure 6:
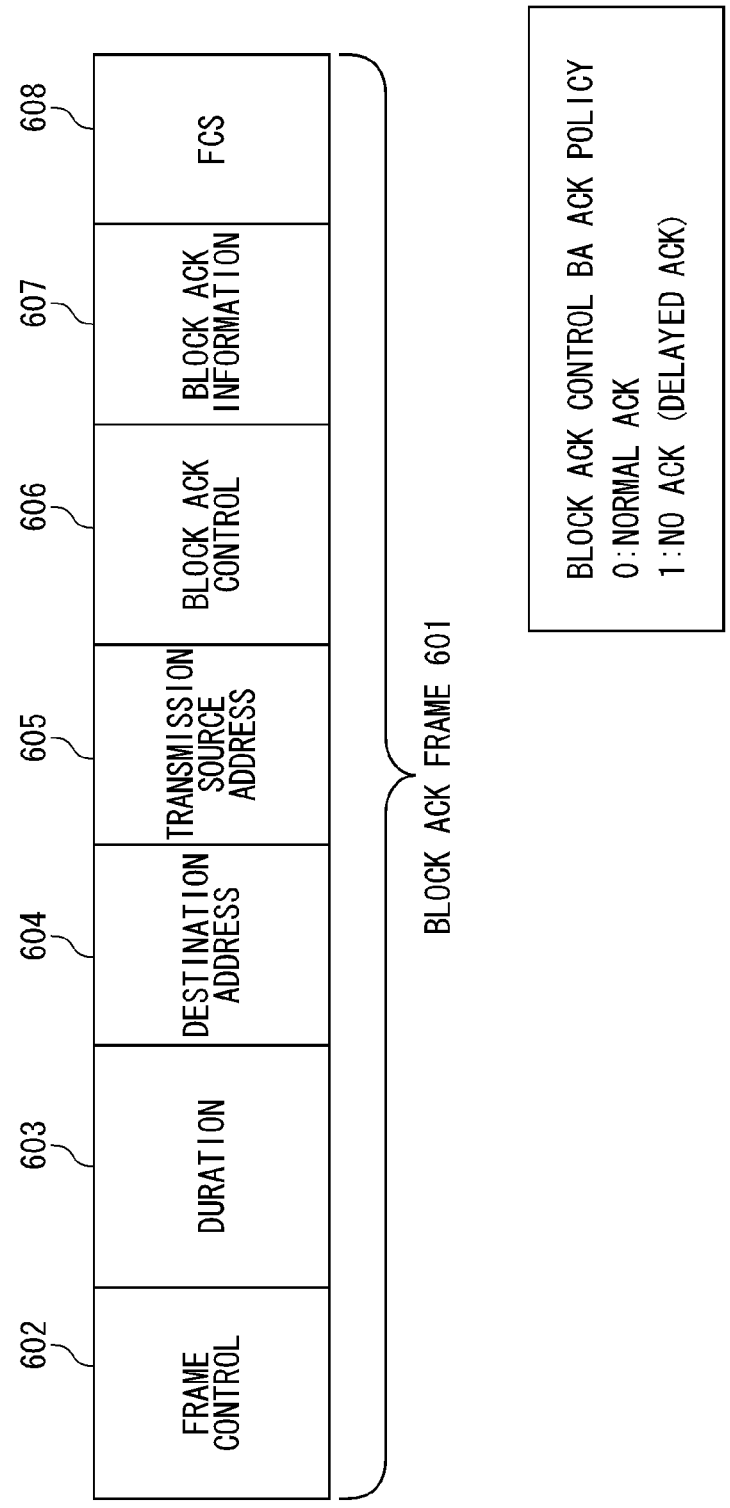
FIG. 6 is a diagram illustrating a configuration of a block ACK frame.

FIG. 6 is a diagram illustrating a configuration of the block ACK frame. A block ACK frame 601 includes a frame control field 602 indicative of the block ACK, a block ACK control field 606 indicative of the type of the block ACK, and a block ACK information field 607 which is ACK information of a plurality of frames that has been received in the past. Also, the block ACK frame 601 includes a duration field 603, a destination address field 604, a transmission source address field 605, and an FCS 608. The block ACK control field 606 stores, as information (block ACK control BA ACK policy) indicative of the type of the block ACK, any one of "0": immediate ACK transmission (normal ACK), and "1": no ACK transmission (delay ACK) therein.

The MAC frame generated by the MAC controller 104 is modulated to the PLCP frame in the modulator 107 of the transmitter 103. The PLCP frame includes the MAC frame added with the PHY header. The PHY header stores a parameter used for modulation therein, and includes an MCS (modulation and coding scheme) indicative of the modulation and a coding scheme of an error correction.

Figure 7:
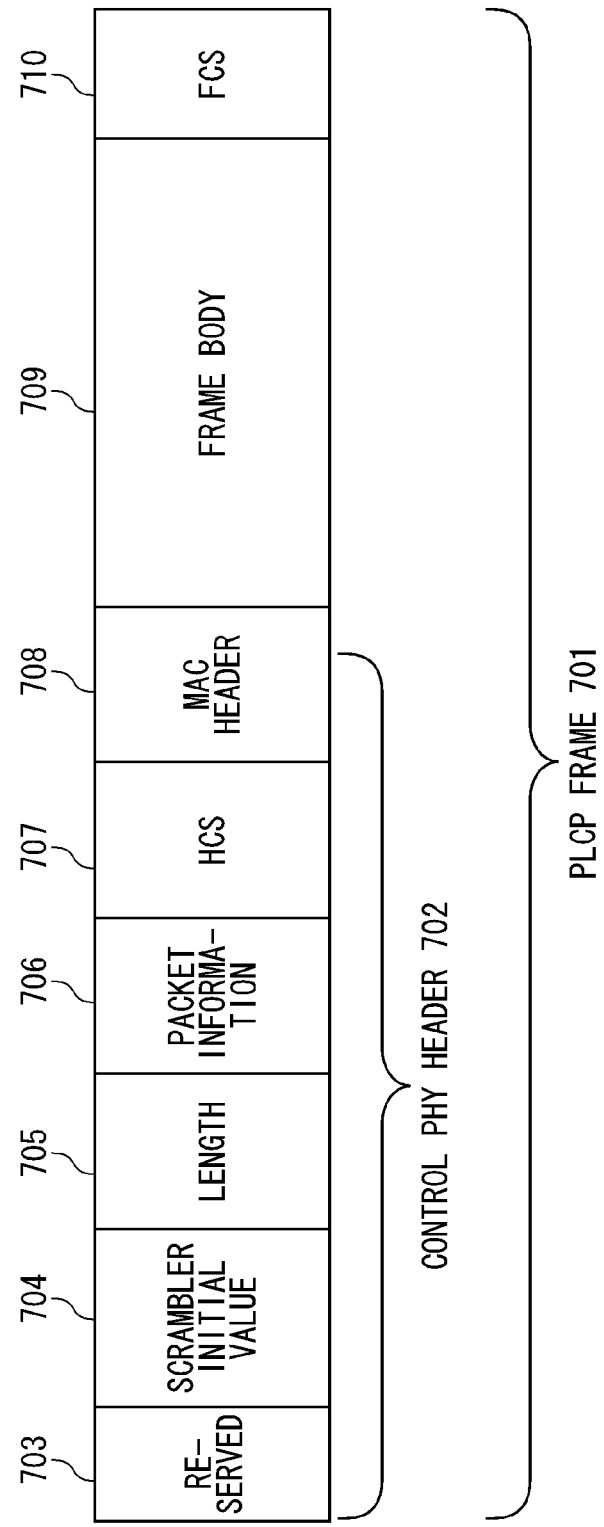
FIG. 7 is a diagram illustrating a configuration of a PLCP frame in a mode for transmitting control information.

FIG. 7 is a diagram illustrating a PLCP frame including a control PHY header in a mode for transmitting the control information. A control PHY header 702 of a PLCP frame 701 includes a scrambler initial value (scrambler init) field 704 indicative of an initial value (scrambler system information) for bit scrambler, a length (length) field 705 represented by a byte length of the overall frame, a packet information field 706, and an HCS (header check sequence) field 707 that detects an error of the header.

Also, the control PHY header 702 includes a reserved (reserved) field 703 for future extension. In the mode for transmitting the control information, because one kind of modulation system is provided, the MCS field is omitted in the control PHY header 702.

The PLCP frame 701 includes a MAC header 708, a frame body 709, and an FCS 710 as the MAC frame, after the control PHY header 702.

Figure 8:
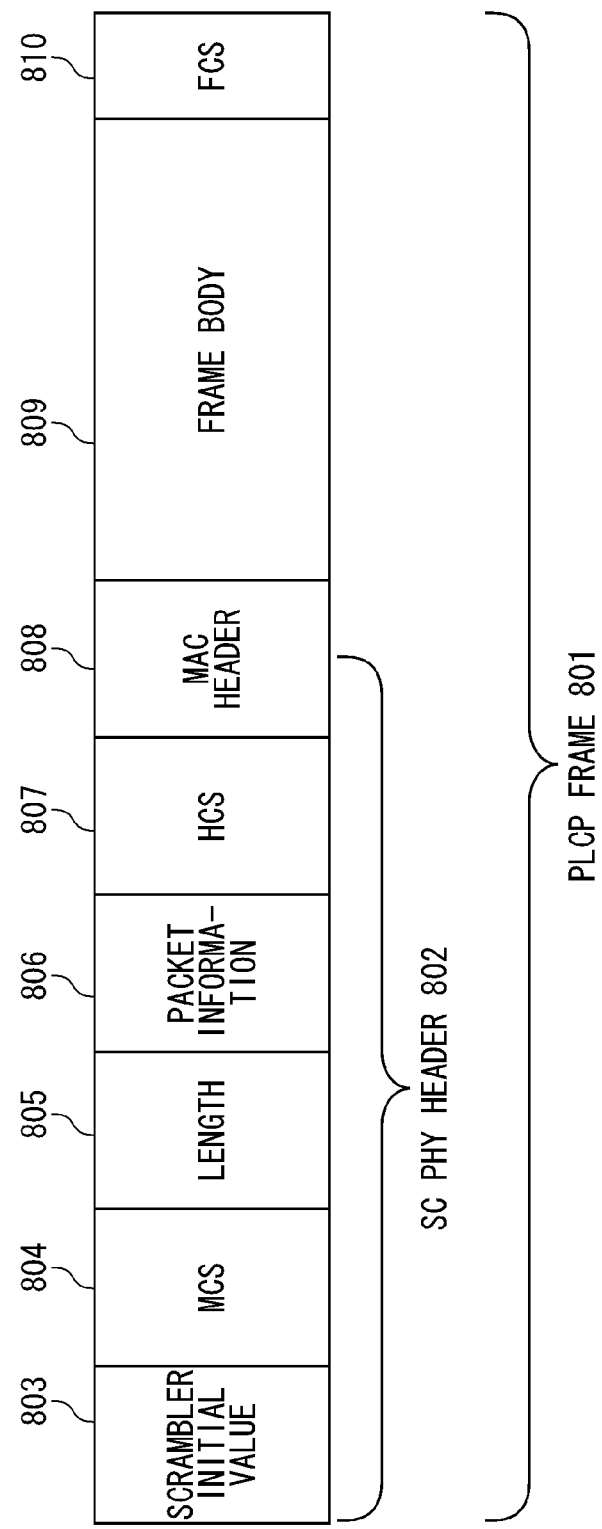
FIG. 8 is a diagram illustrating a configuration of the PLCP frame in a mode for transmitting data.

FIG. 8 is a diagram illustrating the PLCP frame including the SC PHY header in the mode for transmitting the data. An SC PHY header 802 of a PLCP frame 801 includes a scrambler initial value field 803, an MCS field 804, a length (length) field 805, a packet information field 806, and an HCS field 807. In the mode for transmitting the data, because a transmission rate is variable, the MCS field 804 for designating the MCS to be used is provided in the SC PHY header 802.

The PLCP frame 801 includes a MAC header 808, a frame body 809, and an FCS 810 as the MAC frame after the SC PHY header 802.

The PLCP frame having any one of the above configurations is divided on a block unit on the basis of the coding scheme designated by the MCS of the PHY header, and subjected to error correcting coding by the modulator 107 of the transmitter 103, and thereafter converted into a digital modulation signal on the basis of the modulation system designated by the MCS. In the modulator 107, the preamble necessary for the reception processing is added, and modulated to the PHY frame. The PHY frame is output by the transmitter 103, and converted into the radio frequency signal and transmitted by the RF section 203.

Figure 9:
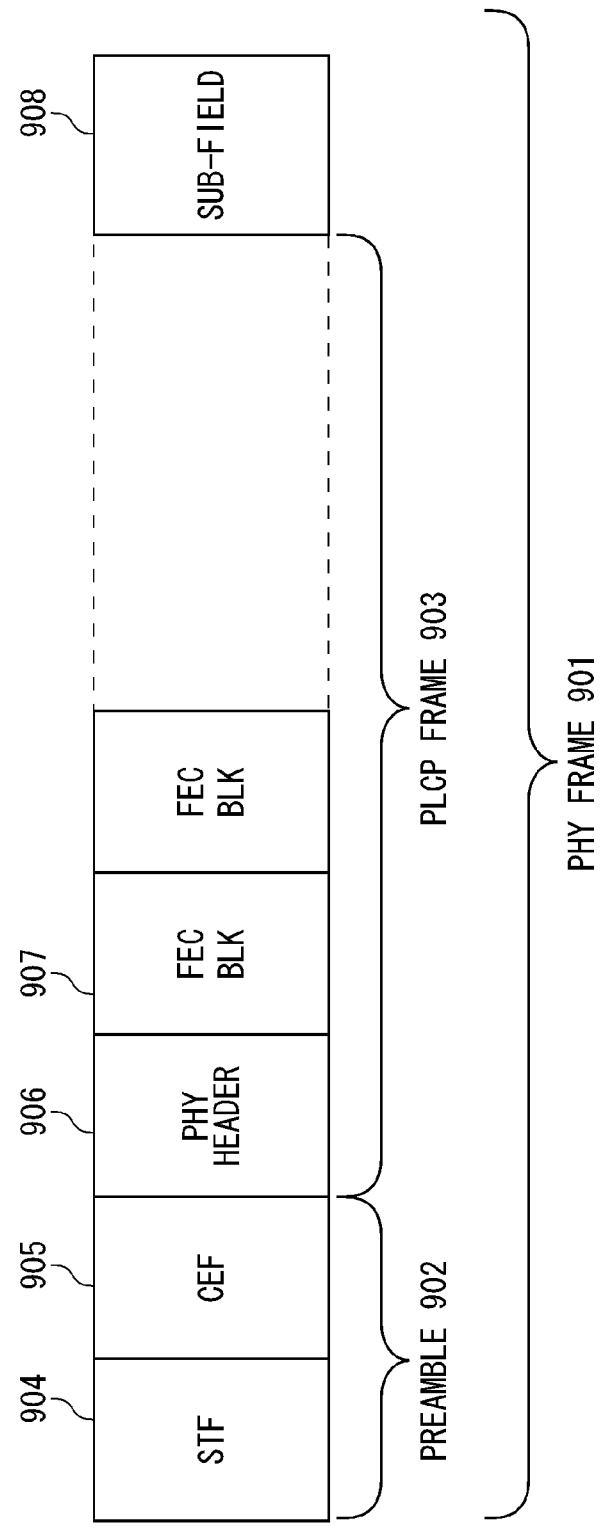
FIG. 9 is a diagram illustrating a configuration of a PHY frame.

FIG. 9 is a diagram illustrating a configuration of the PHY frame. A PHY frame 901 includes a preamble 902, and a PLCP frame 903. The preamble 902 includes an STF (short training field) field 904, and a CEF (channel estimation field) field 905. The PLCP frame 903 includes a PHY header 906, and a plurality of FEC (forward error correction) block fields (FECBLK) 907. The PHY frame 901 includes a sub-field 908 after the PLCP frame 903.

Figure 10:
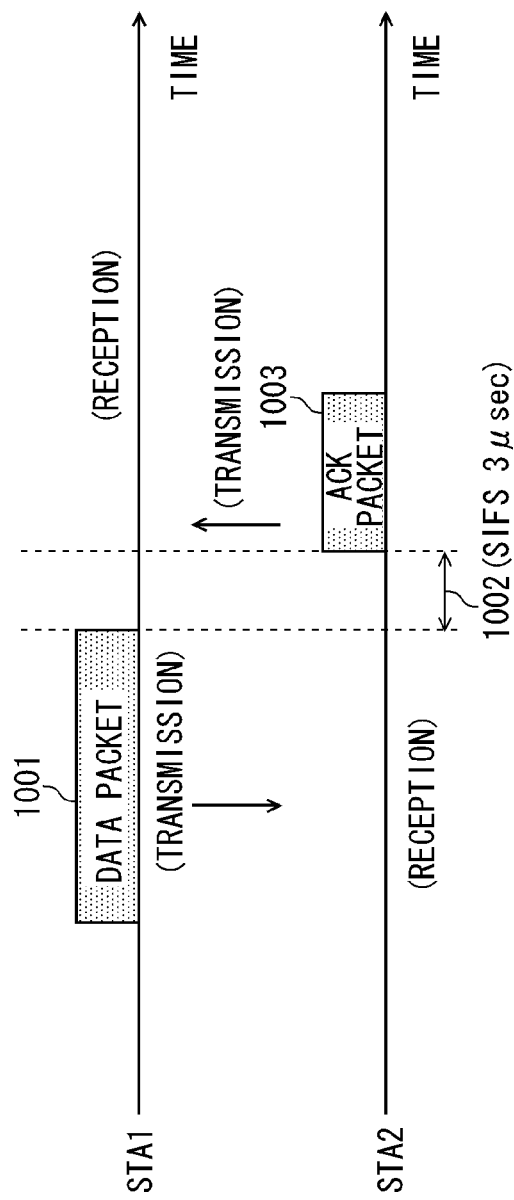
FIG. 10 is a timing chart illustrating the operation when transmitting an ACK.

FIG. 10 is a timing chart illustrating the operation when transmitting the ACK. The wireless communication terminal 301 (STA1) transmits a data packet 1001 for the wireless communication terminal 302 (STA2), and the wireless communication terminal 302 (STA2) receives the data packet 1001. The wireless communication terminal 302 (STA2) determines the success or failure of reception, and the type of ACK according to the information on the MAC frame of the data packet 1001. In this example, when the packet addressed to the own station can be received without error, and the immediate ACK transmission is required, the wireless communication terminal 302 (STA2) transmits an ACK packet 1003 for the wireless communication terminal 301 (STA1) after the wireless communication terminal 302 finishes the reception processing, and the short inter-frame spacing (SIFS, 3 µsec) 1002 elapses.

Figure 11:
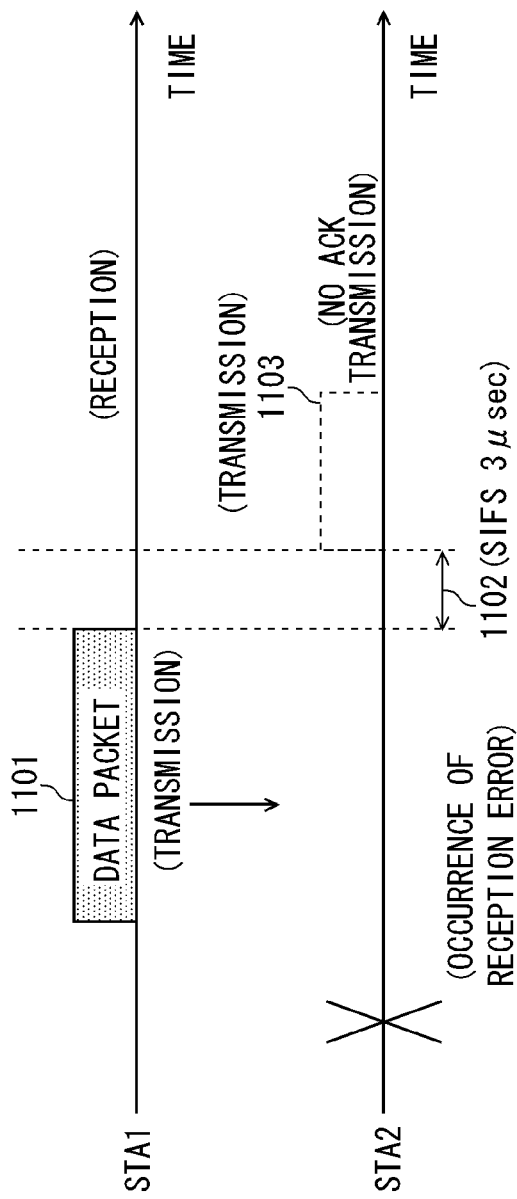
FIG. 11 is a timing chart illustrating the operation when a reception error occurs.

When the conditions of the above immediate ACK transmission are not satisfied, the wireless communication terminal 302 (STA2) executes the following operation. FIG. 11 is a timing chart illustrating the operation when a reception error occurs. The wireless communication terminal 302 (STA2) does not transmit the ACK when the reception error occurs while a data packet 1101 is being demodulated. That is, an ACK packet 1103 is not transmitted after the reception processing has been finished, and a short inter-frame spacing 1102 has elapsed.

Figure 12:
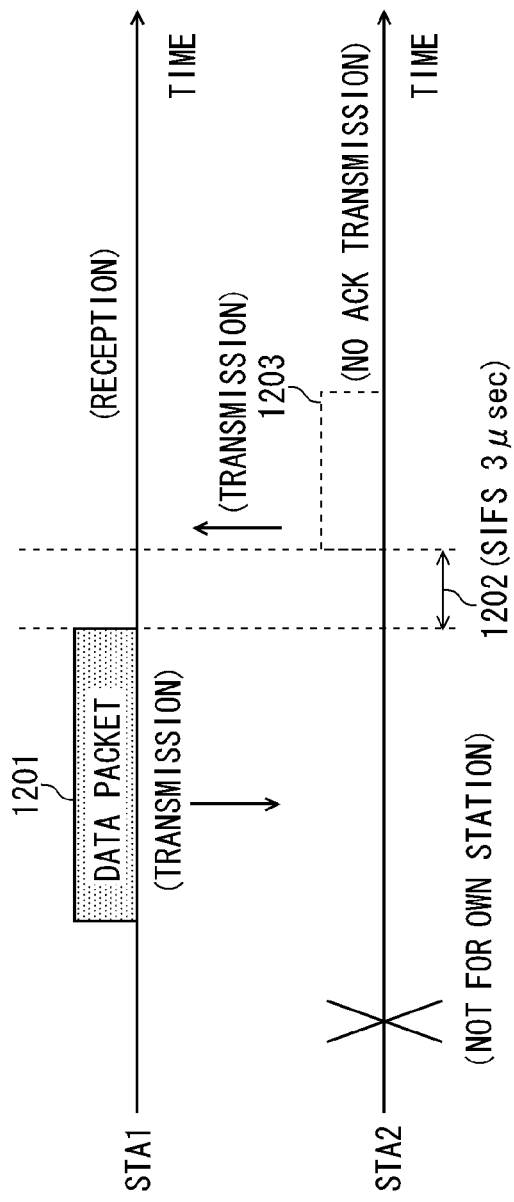
FIG. 12 is a timing chart illustrating the operation when a packet is not addressed to an own station.

FIG. 12 is a timing chart illustrating the operation when the packet is not addressed to an own station. When the destination address field 405 of the MAC header in a data packet 1201 does not match an own station address, the wireless communication terminal 302 (STA2) does not transmit the ACK. That is, after the reception processing has been finished, and a short inter-frame spacing 1202 has elapsed, an ACK packet 1203 is not transmitted.

Figure 13:
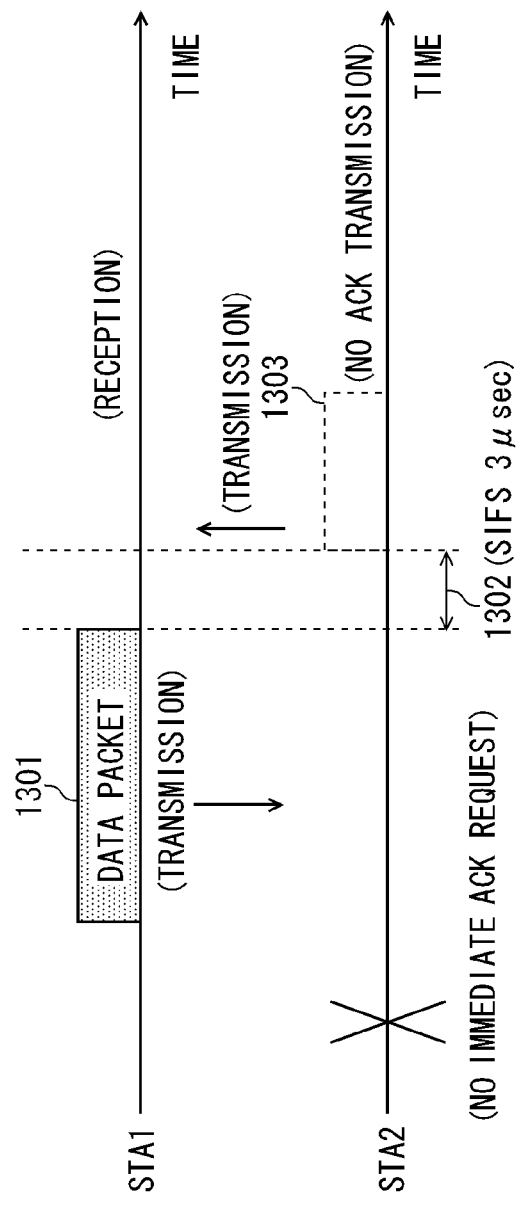
FIG. 13 is a timing chart illustrating the operation when there is no request for immediate ACK transmission.

FIG. 13 is a timing chart illustrating the operation when there is no request for immediate ACK transmission. When the QoS control field 410 of the MAC header in a data packet 1301 is no ACK request for immediate ACK transmission, the wireless communication terminal 302 (STA2) does not immediately transmit the ACK. That is, after the reception processing has been finished, and a short inter-frame spacing 1302 has elapsed, an ACK packet 1303 is not transmitted.

Figure 14:
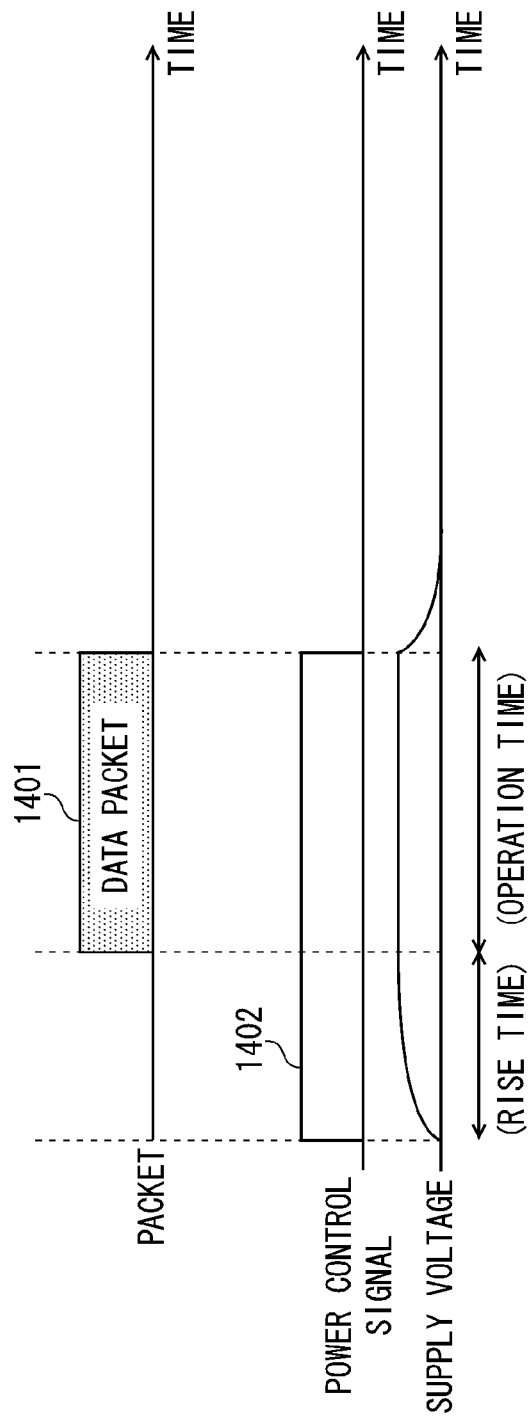
FIG. 14 is a timing chart illustrating the operation when controlling a power supply of the baseband processor.

FIG. 14 is a timing chart illustrating the operation when controlling the power supply of the baseband processor 101. FIG. 14 schematically illustrates a waveform of a rising of the supply voltage under the power control.

When a power control signal 1402 output by the reception power supply section 109 or the transmission power controller 112 is high level (hereinafter referred to as "H"), the corresponding reception power supply section 109 or transmission power supply section 111 supplies the power to the receiver 102 or the transmitter 103.

When the power control signal 1402 is H, the supply voltage to be applied to the circuit of the receiver 102 or the transmitter 103 needs a rise time until the voltage is stabilized due to a load capacity of the circuit. In a subsequent operation time when the supply voltage is stabilized, the circuit to which the power is supplied operates. In order to process a data packet 1401, there is a need to offset the power control signal 1402 the rise time ago to set the power control signal 1402 to H in advance.

Figure 15:
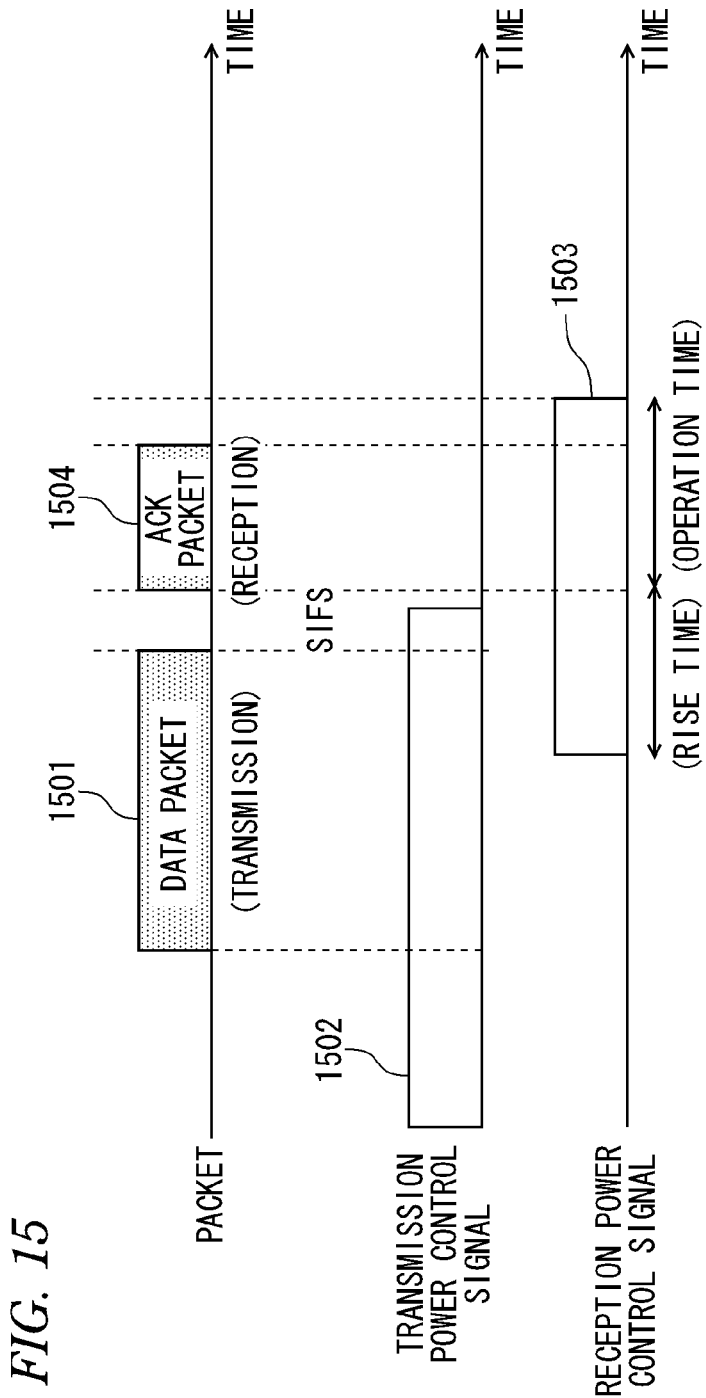
FIG. 15 is a timing chart illustrating the operation of the power control when transmitting a data packet and receiving an ACK packet.
Figure 23:
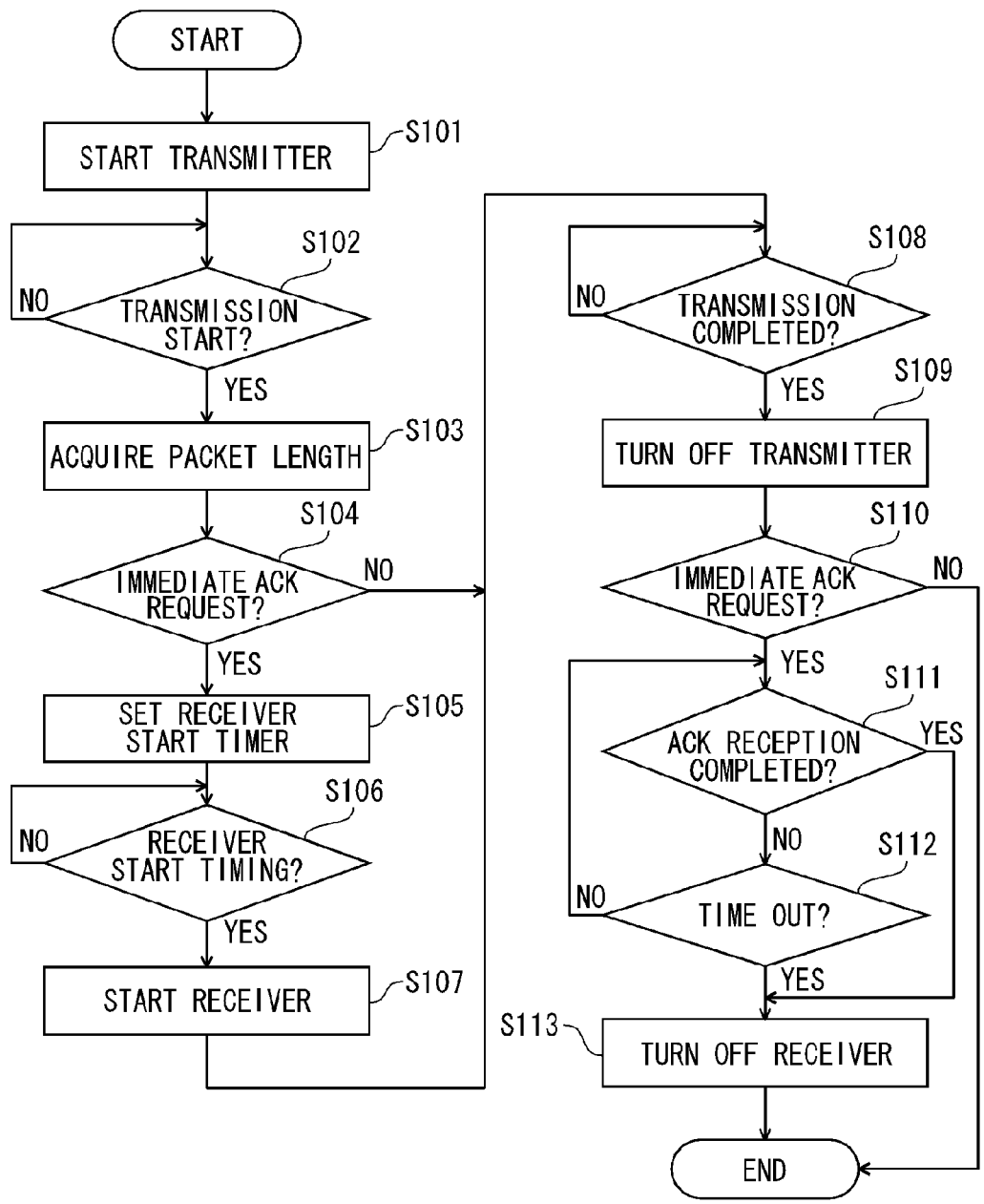
FIG. 23 is a flowchart illustrating a procedure when transmitting the data packet and receiving the ACK packet in a wireless communication terminal according to this embodiment.

FIG. 15 is a timing chart illustrating the operation of the power control when transmitting the data packet and receiving the ACK packet. Also, FIG. 23 is a flowchart illustrating a procedure when transmitting the data packet and receiving the ACK packet in the wireless communication terminal according to this embodiment.

Prior to the transmission of a data packet 1501, the transmission power controller 112 sets a transmission power control signal 1502 to H, and supplies the power to the transmitter 103 to start the transmitter 103 (Step S101). Then, the transmitter 103 determines a transmission start to start the transmission processing (Step S102), and acquires a packet length of the data packet 1501 (Step S103). Then, the transmitter 103 determines whether the ACK request responsive to the transmission of the data packet 1501 is a request for immediate ACK transmission, or not (Step S104), and if the ACK request is the request for immediate ACK transmission, the transmitter 103 sets up a receiver start timer (Step S105).

In the wireless communication terminal on the transmitter side, as illustrated in FIG. 15, the terminal must provide for the reception of the ACK packet 1504 with the short interframe spacing (SIFS) after the transmission of an ACK packet 1504 has been finished. For that reason, the reception power controller 110 offsets a reception power control signal 1503 the power rise time before a time at which the ACK packet is assumed to be arrival from the wireless communication device on the receiver side to set the reception power control signal 1503 to H in advance.

The time at which the ACK packet is assumed to be arrival can be calculated on the basis of the packet length of the data packet 1501. In the transmitter 103, the packet length can be calculated on the basis of the byte length and the MCS set for the PHY header when transmitting the data packet 1501. As a result, the packet length is acquired in Step S103. Then, the reception power controller 110 calculates a timing at which the reception power control signal 1503 is set to H by (packet length+SIFS−power rise time). The calculated timing is set for the receiver start timer in Step S105.

The reception power controller 110 completes the timing of the receiver start timer, and determines whether the timing reaches the receiver start timing, or not (Step S106). If the timing reaches the receiver start timing, the reception power controller 110 sets the reception power control signal 1503 to H, and supplies the power to the receiver 102 to start the receiver 102 (Step S107). As a result, the receiving operation can be conducted immediately when receiving the ACK packet 1504.

Thereafter, the transmission power controller 112 determines the transmission completion (Step S108), and if the transmission processing of the data packet 1501 has been completed, the transmission power controller 112 sets the transmission power control signal 1502 to low level (hereinafter referred to as "L"), and stops the power supply to the transmitter 103 to turn off the circuit operation (Step S109). If there is no request for immediate ACK transmission in the determination in Step S104, the transmission power controller 112 skips Steps S105 to S107, and determines the transmission completion of Step S108.

Subsequently, the reception power controller 110 determines whether the ACK request responsive to the transmission of the data packet 1501 is a request for immediate ACK transmission, or not (Step S110). If the ACK request is the request for immediate ACK transmission, the reception power controller 110 determines whether the reception processing of the ACK packet 1504 has been completed in the receiver 102, or not (Step S111).

In this example, if the reception processing of the ACK packet 1504 has been completed, the reception power controller 110 sets the reception power control signal 1503 to L, and stops the power supply to the receiver 102 to turn off the circuit operation (Step S113). In the power-off of the receiver 102, a termination time of the ACK packet is given a margin with the inclusion of a latency, for example, taking a delay into account because of the wireless transmission, to set a longer operation time.

Also, if the reception processing of the ACK packet 1504 has not been completed, the reception power controller 110 determines whether the timer that times a given period has timed out, or not, (Step S112). In this situation, if the timer has timed out, the reception power controller 110 sets the reception power control signal 1503 to L, and stops the power supply to the receiver 102 to turn off the circuit operation (Step S113).

If there is no request for immediate ACK transmission in the determination in Step S110, this processing is finished as it is.

As illustrated in FIG. 15, when the ACK packet 1504 has been received, after the reception processing has been finished, the reception power controller 110 can set the reception power control signal 1503 to L, and stop the power supply to the receiver 102.

Figure 16:
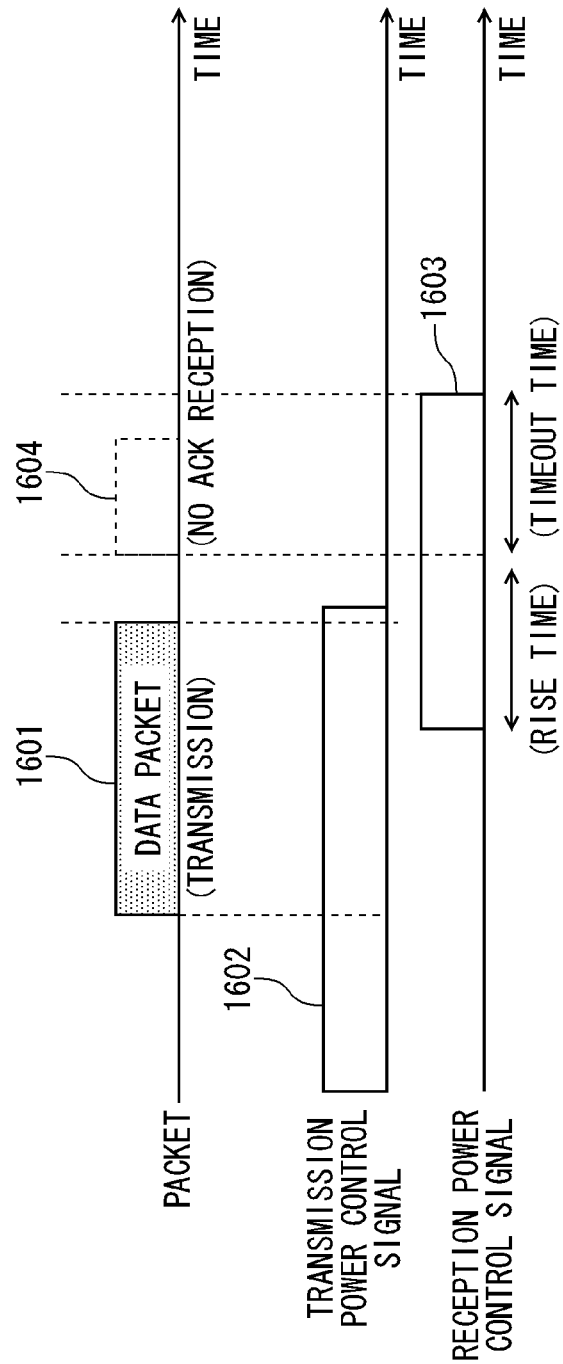
FIG. 16 is a timing chart illustrating the operation of the power control when the reception error occurs on a receiver side.

FIG. 16 is a timing chart illustrating the operation of the power control when the reception error occurs on a receiver side. In the wireless communication terminal on the transmitter side, the transmission power controller 112 sets a transmission power control signal 1602 to H, turns on the power supply to the transmitter 103, and transmits a data packet 1601. In the wireless communication terminal on the receiver side, if a reception error of the data packet 1601 occurs, because an ACK packet 1604 is not transmitted, the reception power controller 110 sets a reception power control signal 1603 to L after timing out the given period, and turns off the power supply to the receiver 102.

Figure 17:
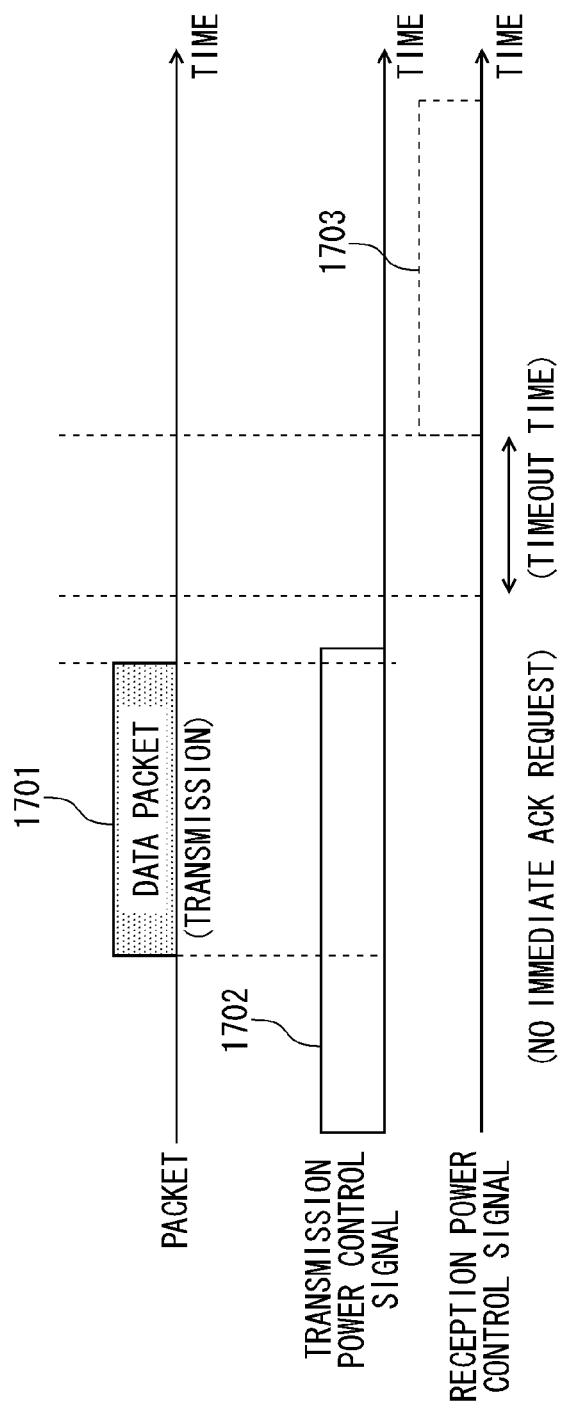
FIG. 17 is a timing chart illustrating the operation of the power control when there is no request for immediate ACK transmission.

FIG. 17 is a timing chart illustrating the operation of the power control when there is no request for immediate ACK transmission. In the wireless communication terminal on the transmitter side, the transmission power controller 112 sets a transmission power control signal 1702 to H, turns on the power supply to the transmitter 103, and transmits a data packet 1701.

When transmitting the data packet 1701, if there is no request for immediate ACK transmission in the QoS control field 410 of the MAC header (no in Steps S104 and S110), the reception power controller for the ACK reception becomes unnecessary. The reception power controller 110 keeps the L level of a reception power controller 1703, and maintains the power-off of the receiver 102. Then, the reception power controller 110 may conduct the operation to set the reception power controller 1703 to H for conducting the subsequent communication operation, for example, a reception standby.

Figure 18:
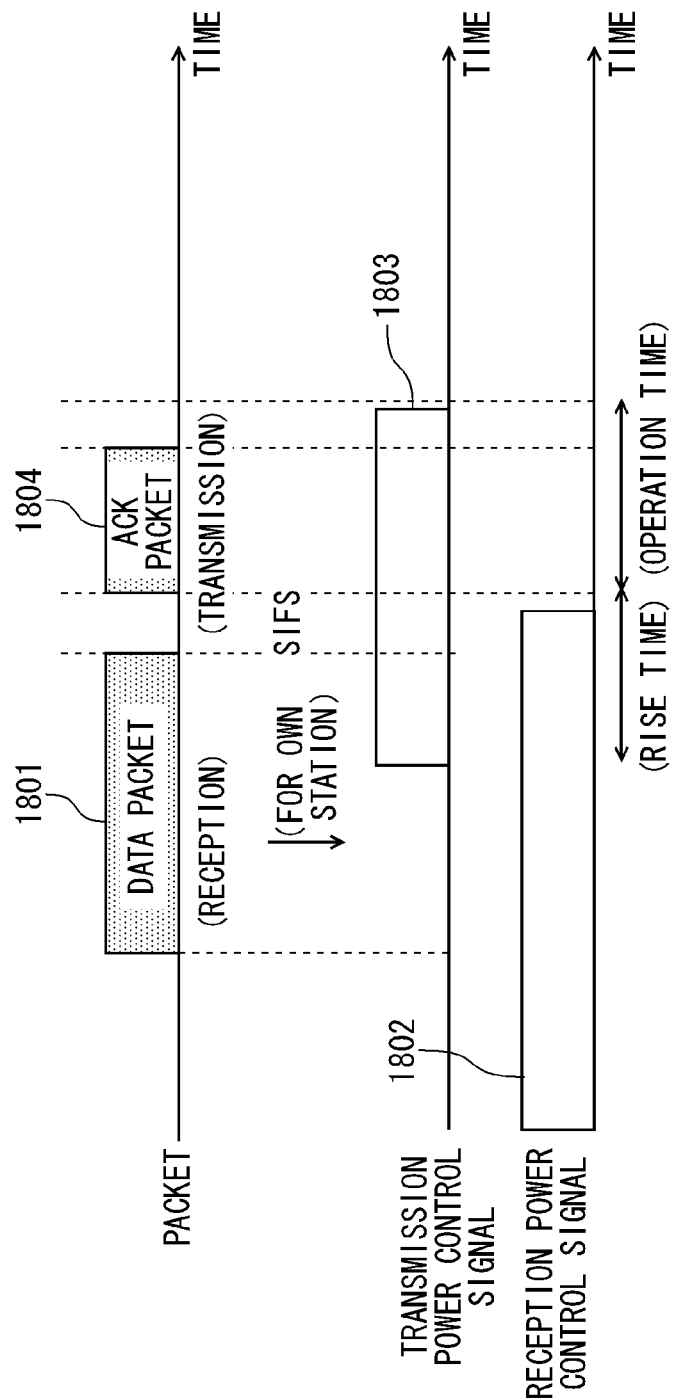
FIG. 18 is a timing chart illustrating the operation of the power control when receiving the data packet and transmitting the ACK packet.
Figure 24:
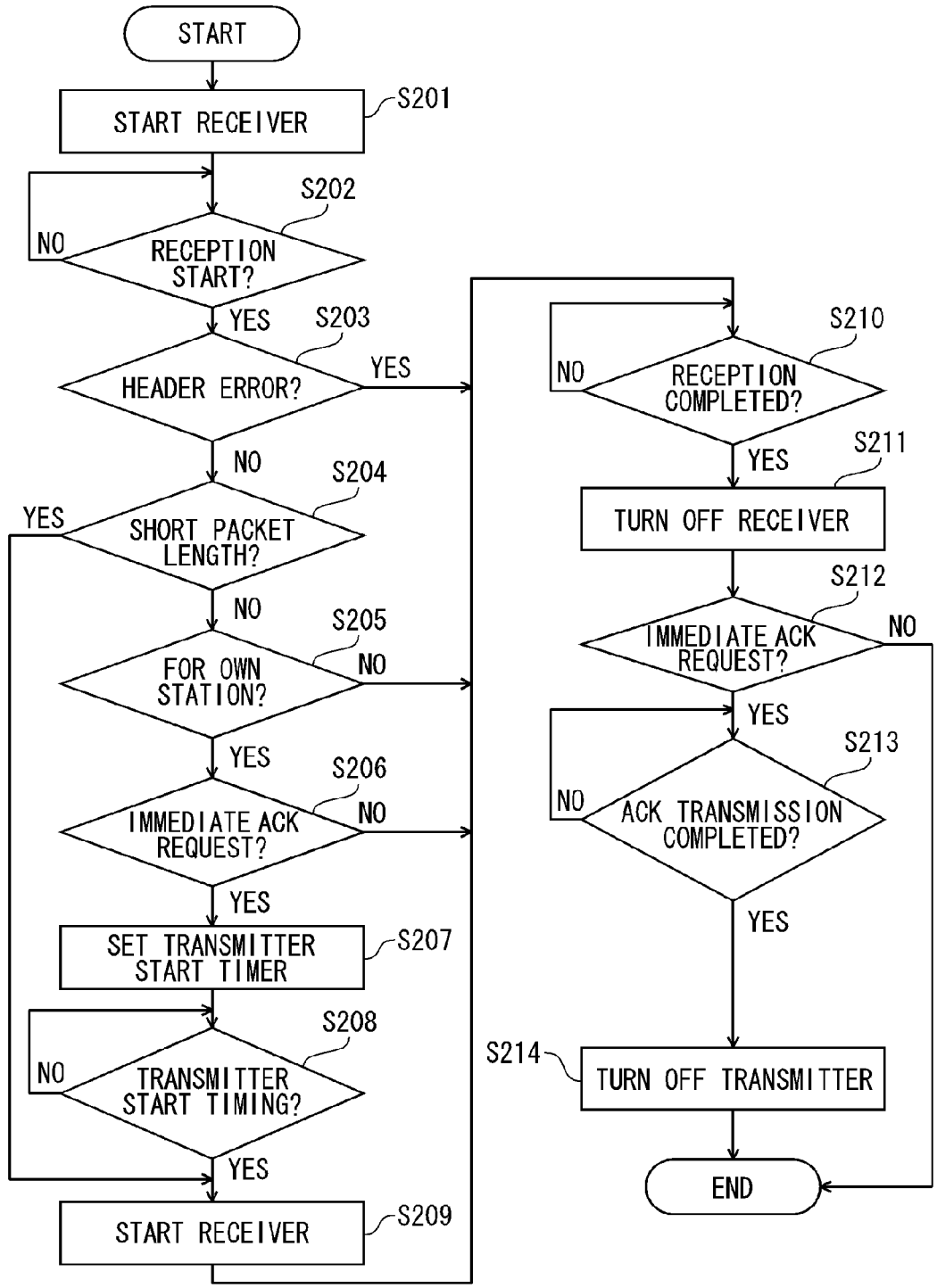
FIG. 24 is a flowchart illustrating a procedure when receiving the data packet and transmitting the ACK packet in the wireless communication terminal according to this embodiment.

FIG. 18 is a timing chart illustrating the operation of the power control when receiving the data packet and transmitting the ACK packet. Also, FIG. 24 is a flowchart illustrating a procedure when receiving the data packet and transmitting the ACK packet in the wireless communication terminal according to this embodiment.

Prior to the transmission of a data packet 1801, the reception power controller 110 sets a reception power control signal 1802 to H, and supplies the power to the receiver 102 to start the receiver 102 (Step S201). As a result, the wireless communication terminal comes to a reception standby state. Then, when the data packet 1801 is arrival, the receiver 102 determines a reception start to start the reception processing (Step S202).

Subsequently, the receiver 102 determines whether there has been an error (header error) in the demodulation of the header of the received data packet 1801, or not (Step S203). If there is no error in the header, the receiver 102 acquires the packet length, and determines whether the packet length is a short packet length of a given value or lower, or not (Step S204). The receiver 102 can calculate the packet length on the basis of the byte length and the MCS which are set for the PHY header of the received data packet 1801.

If the received data packet 1801 is not the short packet length, the receiver 102 determines whether the destination address field 405 of the MAC header matches the own station address, or not, that is, whether the destination address field 405 is the packet for the own station, or not (Step S205). If the destination address field 405 is the packet for the own station, the receiver 102 determines whether the ACK request responsive to the data packet 1801 is the request for immediate ACK transmission, or not (Step S206). If the ACK request is the request for immediate ACK transmission, the receiver 102 sets the transmitter start timer (Step S207).

In the wireless communication terminal on the receiver side, as illustrated in FIG. 18, the terminal must provide for the transmission of an ACK packet 1804 with the short inter-frame spacing (SIFS) after the reception of the data packet 1801 has been finished. However, if the ACK transmission start is determined according to whether there is an error in the FCS field 412 added at the end of the MAC frame, or not, the power rise time is not obtained, and the ACK transmission processing is not on time.

For that reason, in this embodiment, at the time when it is determined that the destination address field 405 is the packet for the own station with the user of the destination address field 405 of the MAC header which enables the determination at an early stage of the reception processing, the transmission power controller 112 sets a transmission power control signal 1803 to H. For example, in the millimeter wave wireless communication system, the PHY header can be demodulated to about 3 μsec, and the MAC header can be demodulated to about 4 μsec, from the reception start of the data frame.

It is desirable to further adjust the timing at which the transmission power control signal 1803 is set to H on the basis of the packet length of the received data packet 1801. The receiver 102 acquires the packet length on the basis of the byte length and the MCS which are set in the PHY header of the data packet 1801 in Step S204, and calculates the timing at which the transmission power control signal 1803 is set to H according to the packet length. The receiver 102 sets the calculated timing for the transmitter start timer in Step S207.

The transmission power controller 112 completes the timing of the transmitter start timer, and determines whether the timing reaches the transmitter start timing, or not (Step S208). If the timing reaches the transmitter start timing, the transmission power controller 112 sets the transmission power control signal 1803 to H, and supplies the power to the transmitter 103 to start the transmitter 103 (Step S209). As a result, the transmitting operation can be conducted immediately when transmitting the ACK packet 1804.

Thereafter, the reception power controller 110 determines the reception completion (Step S210), and if the reception processing of the data packet 1801 has been completed, the reception power controller 110 sets the reception power control signal 1802 to low, and stops the power supply to the receiver 102 to turn off the circuit operation (Step S211). In the power-off of the receiver 102, a termination time of the data packet is given a margin for example, taking a delay into account because of the wireless transmission, to set a longer operation time.

If there is the header error in the determination in Step S203, if there is no packet for the own station in the determination in Step S205, and if there is no request for immediate ACK transmission in the determination in Step S206, the subsequent steps are skipped to determine the reception completion in Step S210.

Subsequently, the transmission power controller 112 determines whether the ACK request responsive to the data packet 1801 is the request for immediate ACK transmission, or not (Step S212). If the ACK request is the request for immediate ACK transmission, the transmitter 103 determines whether the transmission processing of the ACK packet 1804 has been completed, or not (Step S213). When the reception processing in the receiver 102 is completed, no error is detected in the FCS field 412 added at the end of the MAC frame, and the immediate ACK transmission is requested by the MAC head, the transmitter 103 transmits the ACK packet 1804.

If the transmission processing of the ACK packet 1804 has been completed, the transmission power controller 112 sets the transmission power control signal 1803 to L, and stops the power supply to the transmitter 103 to turn off the circuit operation (Step S214).

If there is no request for immediate ACK transmission in the determination in Step S212, this processing is finished as it is.

As illustrated in FIG. 18, when the data packet 1801 can be received without error, and the request for immediate ACK transmission is made, the transmission power control signal 1803 is set to H early at the time of demodulating the MAC header to start the transmitter 103. As a result, the reception processing of the data packet 1801 is finished, and the ACK packet 1804 can be transmitted immediately after the short inter-frame spacing (SIFS) has elapsed.

Also, after the reception processing has been finished, the reception power control signal 1802 can be set to L to turn off the power supply to the receiver 102. After the transmission processing of the ACK packet 1804 has been finished, the transmission power control signal 1803 can be set to L to turn off the power supply to the transmitter 103.

In FIG. 18, the reception power control signal 1802 is set to L after the transmission processing of the ACK packet 1804 has been finished, and a given time has elapsed. Alternatively, the reception power control signal 1802 may be set to L immediately after the transmission processing of the ACK packet 1804 has been finished.

Figure 19:
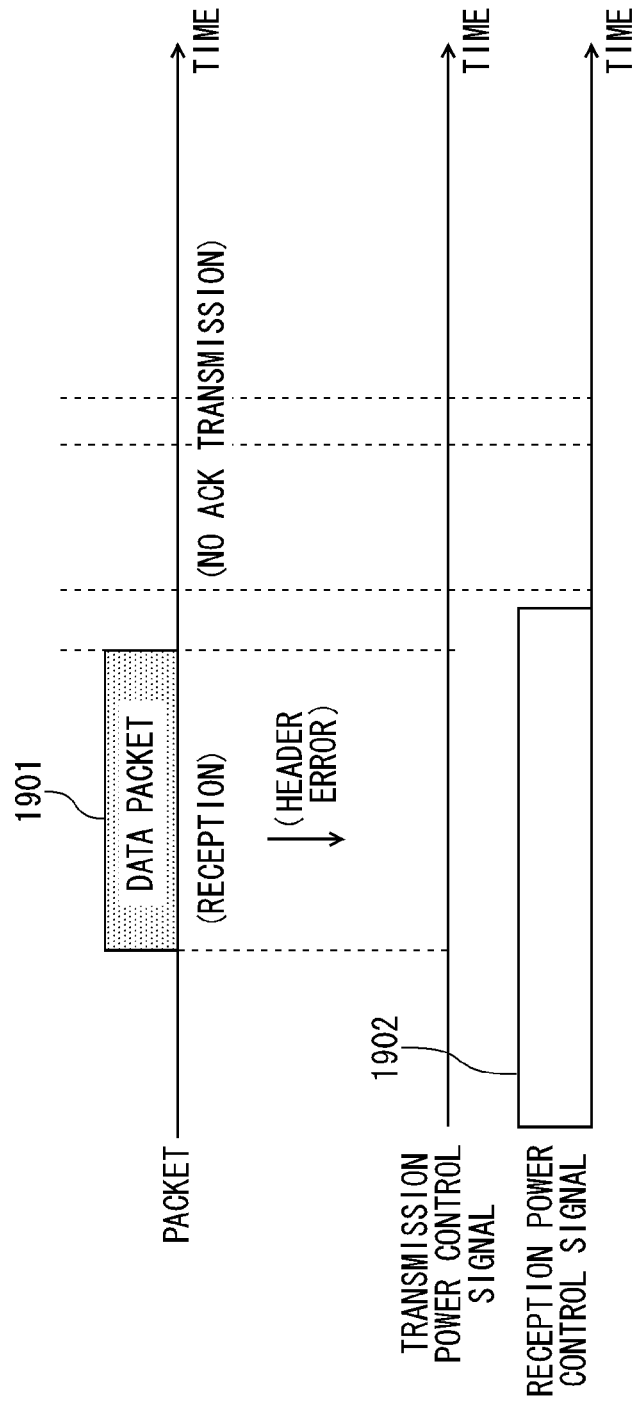
FIG. 19 is a timing chart illustrating the operation of the power control when an error is detected in a PHY header of the received data packet.

FIG. 19 is a timing chart illustrating the operation of the power control when an error is detected in the PHY header of the received data packet. The wireless communication terminal on the receiver side sets a reception power control signal 1902 to H to turn on the power supply to the receiver 102 by the reception power controller 110, and receives a data packet 1901.

In the reception processing, if an error is detected in the HCS field 807 of the PHY header (yes in Step S203), since the ACK packet is not transmitted, the transmission power controller 112 keeps the L level of the transmission power control signal, and maintains the power-off of the transmitter 103.

Figure 20:
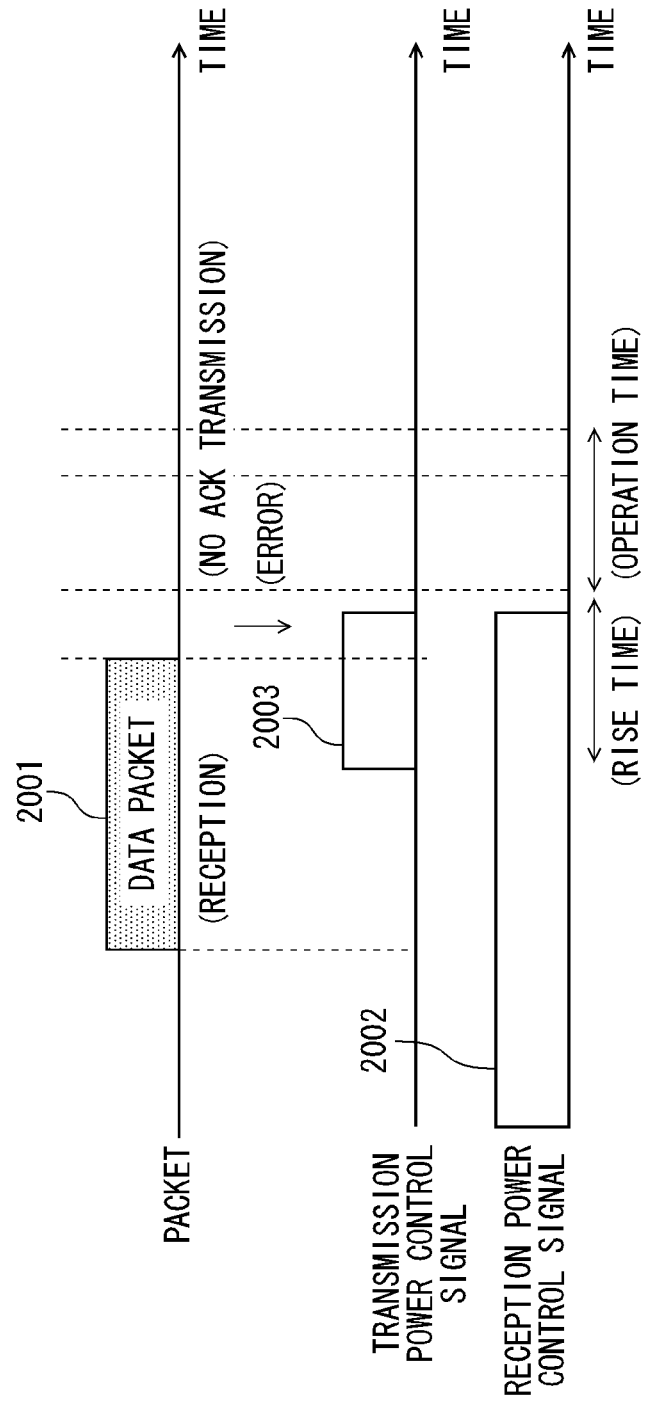
FIG. 20 is a timing chart illustrating the operation of the power control when the error is detected in an FCS field of the received data packet.

FIG. 20 is a timing chart illustrating the operation of the power control when the error is detected in the FCS field of the received data packet. The wireless communication terminal on the receiver side sets a reception power control signal 2002 to H to turn on the power supply to the receiver 102, and receives a data packet 2001 by the reception power controller 110.

If the timing reaches the transmitter start timing during the reception processing, the wireless communication terminal sets a transmission power control signal 2003 to H, and turns on the power supply to the transmitter 103 in advance, taking the power rise time into account. If an error is detected in the FCS field 412 of the received data packet 2001, since the ACK packet is not transmitted, the transmission power controller 112 sets the transmission power control signal 2003 to L at the time of detecting the error, and can turn off the power supply to the transmitter 103.

Figure 21:
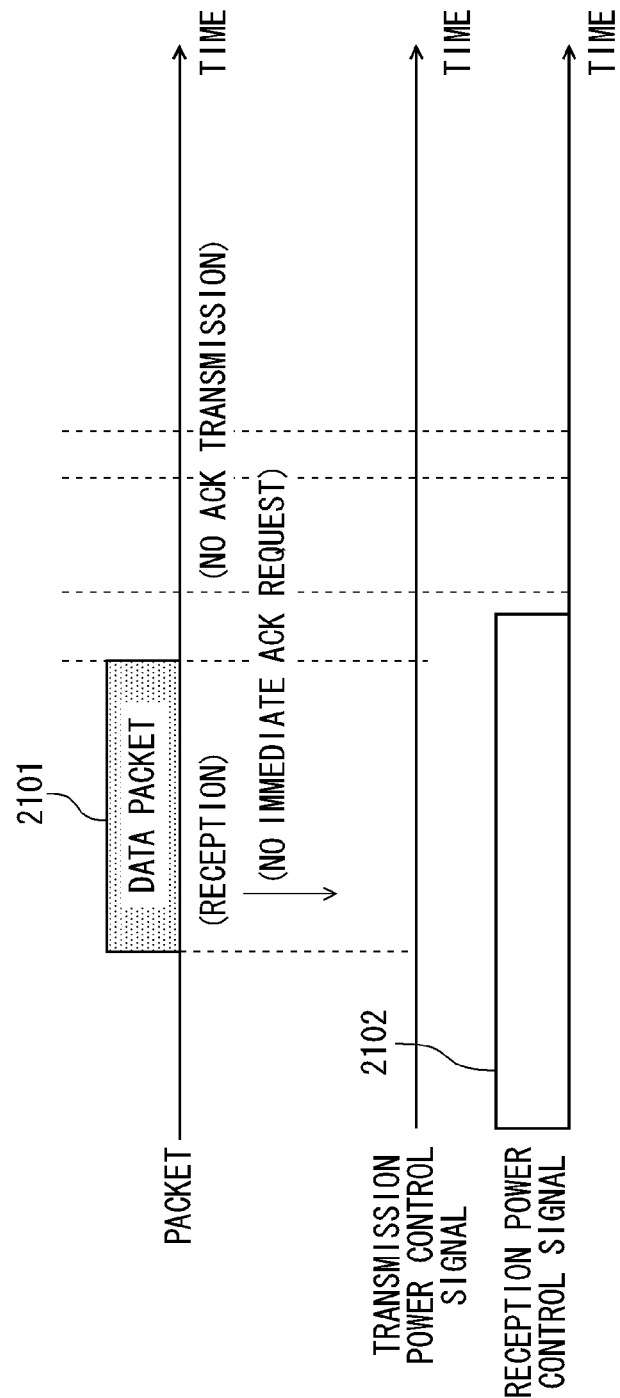
FIG. 21 is a timing chart illustrating the operation of the power control when there is no request for immediate ACK transmission.

FIG. 21 is a timing chart illustrating the operation of the power control when there is no request for immediate ACK transmission. The wireless communication terminal on the receiver side sets a reception power control signal 2102 to H to turn on the power supply to the receiver 102, and receives a data packet 2101 by the reception power controller 110.

If there is no request for immediate ACK transmission in the QoS control field 410 of the MAC header in the received data packet 2101 (no in Steps S206 and S212), the transmission power controller for the ACK transmission becomes unnecessary. The transmission power controller 112 keeps the L level of the transmission power control signal, and maintains the power-off of the transmitter 103.

Figure 22:
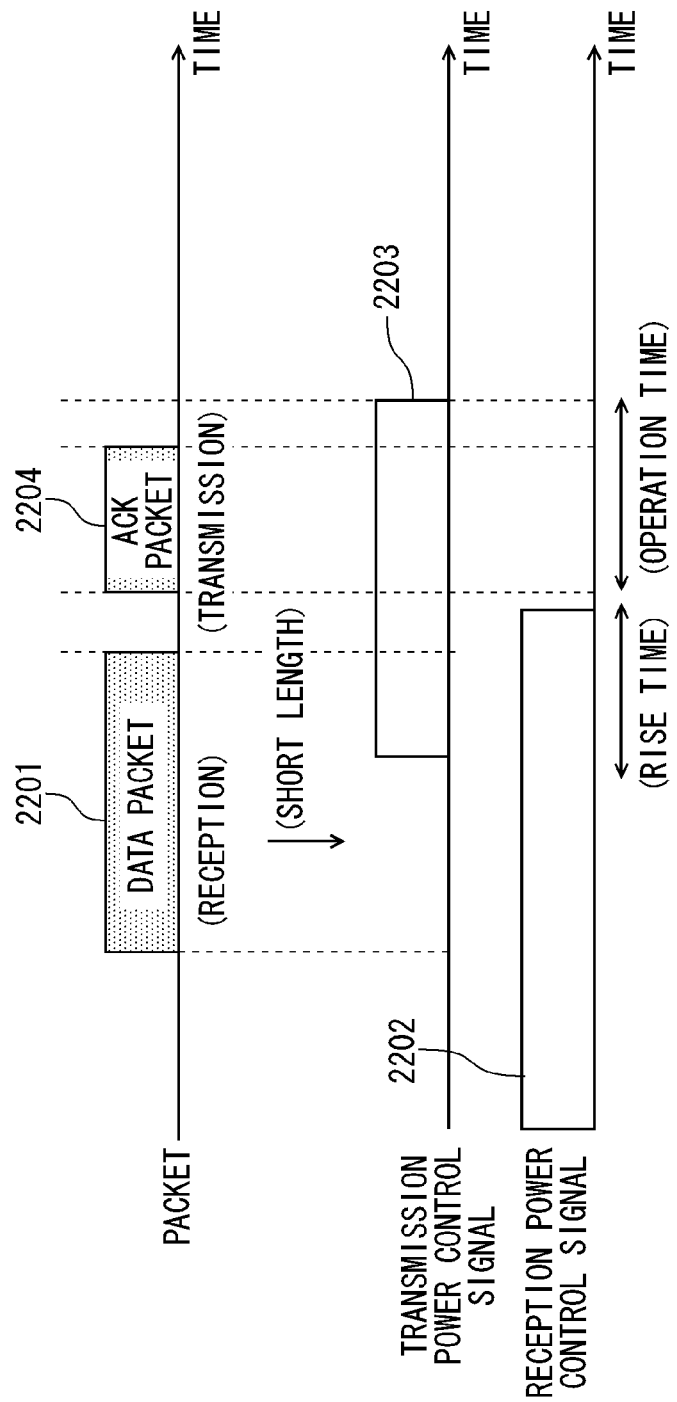
FIG. 22 is a timing chart illustrating the operation of the power control when the received data packet has a short packet length.

FIG. 22 is a timing chart illustrating the operation of the power control when the received data packet has a short packet length. The wireless communication terminal on the receiver side sets a reception power control signal 2202 to H to turn on the power supply to the receiver 102, and receives a data packet 2201 by the reception power controller 110.

If it is determined from the PHY header of the received data packet 2201 that the packet length (length) is shorter than a given value (yes in Step S204), the transmission power controller 112 may set a transmission power control signal 2203 to H at the time of determining the short packet length, and may turn on the power supply to the transmitter 103. The transmission power controller 112 can conduct the transmission power control to also deal with the reception of the data packet 2201 having the short packet length, and can transmit an ACK packet 2204 immediately after the reception processing has been finished, and the short inter-frame spacing has elapsed.

As has been described above, in this embodiment, because the power supplies of the transmitter and the receiver are separated from each other and controlled, the power supplies can turns on/off in the transmitter and the receiver, independently from each other. At the time when the header included in the packet which is now being received could be demodulated, if it is predicted that the packet is transmitted immediately after the demodulation, the power supply to the transmitter turns on in advance, taking the power rise time into account. If it is predicted that the packet is received immediately after the transmission, from the header included in the packet which is now being received, the power supply to the receiver turns on in advance, taking the power rise time into account.

As a result, even in the millimeter wave wireless communication that executes the high-speed packet transmission, the power on/off of the transmitter and the receiver can be controlled at the timing of the data packet to be transmitted and the ACK packet responsive to the data packet to be transmitted. Accordingly, a time when the power supply to the transmitter and the receiver is off is provided for each of the packets under the power control, the leakage current can be reduced, and the power consumption can be reduced.

Hence, this embodiment is applied to a semiconductor device of a semiconductor integrated circuit that processes the baseband signal in the wireless communication device. As a result, the power saving of the device can be conducted, and the leakage current can be reduced. In particular, this embodiment is applied to the wireless communication device including a mobile communication device requiring the low power consumption in the wireless communication system requiring the high speed signal processing and the low latency, thereby obtaining the large advantages.

According to the present invention, modifications and applications by an ordinary skilled person on the basis of the disclosure of the present specification and known techniques without departing from the subject matter and scope of the present invention are also intended by the present invention, and included in a scope to be protected. Also, the respective components in the above embodiments may be arbitrarily combined together without departing from the subject matter of the present invention.

In the above respective embodiments, an example in which the present invention is configured by a hardware has been described. Alternatively, the present invention can be realized by a software.

Also, the respective functional blocks used in the description of the respective embodiments are realized as an LSI that is typically an integrated circuit. Each of those functional blocks may be configured by one chip, or a part or all of those functional blocks may be integrated into one chip. In this example, the chip is called the LSI, but may be called IC, system LSI, super LSI, or ultra LSI due to a difference in integration.

Also, a technique of the integrated circuit is not limited to the LSI, but may be realized by a dedicated circuit or a general-purpose processor. There may be used an FPGA (field programmable gate array) that is programmable after manufacturing an LSI, or a reconfigurable processor that can reconfigure the connection or setting of a circuit cell within the LSI.

Also, the calculations of the respective functional blocks can be conducted by using, for example, a DSP or a CPU. Further, the processing steps of the respective functions can be recorded in a recording medium as a program, and executed.

Further, if a technology for integration circuit which is substituted for the LSI appears due to the development of the semiconductor technology or another technology derived therefrom, the functional blocks may be integrated by that technology. A biotechnology may be applied.

The present application is based on Japanese Patent Application No. 2011-075833 filed on Mar. 30, 2011, the contents of which are incorporated herein by reference.

INDUSTRIAL APPLICABILITY

The present invention has an advantage that the power consumption of the circuit that performs the signal processing can be reduced in the millimeter wave wireless communication that performs the high speed transmission. For example, the present invention is useful as the wireless communication device applied to the wireless communication system requiring the high speed signal processing and the low latency, and the semiconductor device including the wireless communication circuit, and can be widely applied to the general wireless communication devices including a mobile communication device requiring the low power consumption.

REFERENCE SIGNS LIST

101: Baseband processor
102: Receiver
103: Transmitter
104: MAC controller
105: AD converter
106: Demodulator
107: Modulator
108: DA converter
109: Reception power supply section 110: Reception power controller
111: Transmission power supply section
112: Transmission power controller
201: Wireless processor
202: Antenna
203: RF section
204: Host processor
301, 302, 303: Wireless communication terminal

The invention claimed is:

1. A wireless communication device, comprising:
a transmitter that performs transmission processing in a wireless communication;
a transmission power supply section that supplies a power to the transmitter;
a transmission power controller that controls a power supply to the transmitter;
a receiver that performs reception processing in a wireless communication;
a reception power supply section that supplies a power to the receiver; and
a reception power controller that controls a power supply to the receiver, wherein
the transmission power controller turns on the power supply to the transmitter at a given time taking a power rise time into account before a start time of the transmission processing in the transmitter, and turns off the power supply to the transmitter when the transmission processing is finished, and
the reception power controller turns on the power supply to the receiver at a given time taking a power rise time into account before a time at which an ACK is assumed to be arrived from a wireless communication device on a receiver side responsive to data transmitted from the transmitter, turns off the power supply to the receiver when the reception processing of the ACK in the receiver is finished, and keeps the power supply to the receiver off if an ACK request responsive to the data is not a type of a request for immediate ACK transmission which requests an ACK transmission when a short inter-frame spacing elapses after completion of the data.

2. The wireless communication device according to claim 1, wherein the reception power controller turns off the power supply to the receiver when a given time elapses after the power supply is turned on, if the receiver fails to receive the ACK from the wireless communication device on the receiver side.

3. A wireless communication device, comprising:
a receiver that performs reception processing in a wireless communication;
a reception power supply section that supplies a power to the receiver;
a reception power controller that controls a power supply to the receiver;
a transmitter that performs transmission processing in a wireless communication;
a transmission power supply section that supplies a power to the transmitter; and
a transmission power controller that controls a power supply to the transmitter, wherein
the reception power controller turns on the power supply to the receiver at a given timing, and turns off the power supply to the receiver when the reception processing of the data in the receiver is finished, and
when the receiver has received data addressed to an own station without errors based on data received by the receiver, the transmission power controller turns on the power supply to the transmitter at a given time taking a power rise time into account before a start time of the transmission processing of an ACK to a wireless communication device on a transmitter side responsive to the received data, turns off the power supply to the transmitter when the transmission processing of the ACK is finished, and keeps the power supply to the transmitter off if an ACK request responsive to the data is not a type of a request for immediate ACK transmission which requests an ACK transmission when a short inter-frame spacing elapses after completion of the data.

4. A semiconductor device, comprising:
a signal processor including:
a transmitter that performs transmission processing in a wireless communication;
a transmission power supply section that supplies a power to the transmitter;
a transmission power controller that controls a power supply to the transmitter;
a receiver that performs reception processing in a wireless communication;
a reception power supply section that supplies a power to the receiver; and
a reception power controller that controls a power supply to the receiver, wherein
the transmission power controller turns on the power supply to the transmitter at a given time taking a power rise time into account before a start time of the transmission processing in the transmitter, and turns off the power supply to the transmitter when the transmission processing is finished,
the reception power controller turns on the power supply to the receiver at a given time taking a power rise time into account before a time at which an ACK is assumed to be arrived from a wireless communication device on a receiver side responsive to data transmitted from the transmitter, turns off the power supply to the receiver when the reception processing of the ACK in the receiver is finished, and keeps the power supply to the receiver off if an ACK request responsive to the data is not a type of a request for immediate ACK transmission which requests an ACK transmission when a short inter-frame spacing elapses after completion of the data, and
a circuit including the signal processor is mounted on a semiconductor substrate.

5. A semiconductor device, comprising:
a signal processor including:
a receiver that performs reception processing in a wireless communication;
a reception power supply section that supplies a power to the receiver;
a reception power controller that controls a power supply to the receiver;
a transmitter that performs transmission processing in a wireless communication;
a transmission power supply section that supplies a power to the transmitter; and
a transmission power controller that controls a power supply to the transmitter; wherein
the reception power controller turns on the power supply to the receiver at a given timing, and turns off the power supply to the receiver when the reception processing of the data in the receiver is finished,
when the receiver has received data addressed to an own station without errors based on data received by the receiver, the transmission power controller turns on the power supply to the transmitter at a given time taking a power rise time into account before a start time of the transmission processing of an ACK to a wireless communication device on a transmitter side responsive to the received data, and turns off the power supply to the transmitter when the transmission processing of the ACK is finished, the transmission power controller keeps the power supply to the transmitter of if a reception error is detected in a header based on header information of the data received by the receiver, and a circuit including the signal processor is mounted on a semiconductor substrate.

* * * * *